(12) United States Patent
Hawkinson et al.

(10) Patent No.: US 8,744,763 B2
(45) Date of Patent: Jun. 3, 2014

(54) USING STRUCTURED LIGHT TO UPDATE INERTIAL NAVIGATION SYSTEMS

(75) Inventors: Wesley J. Hawkinson, Chanhassen, MN (US); Wayne A. Soehren, Wayzata, MN (US); Rida Hamza, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/298,632

(22) Filed: Nov. 17, 2011

(65) Prior Publication Data
US 2013/0131981 A1    May 23, 2013

(51) Int. Cl.
*G01S 1/00* (2006.01)
*G01S 5/02* (2010.01)
*G06K 9/00* (2006.01)

(52) U.S. Cl.
USPC .......................................... 701/468; 382/103

(58) Field of Classification Search
USPC ............ 382/103; 701/200, 400, 468; 345/166
See application file for complete search history.

(56) References Cited

U.S. PATENT DOCUMENTS

| | | | |
|---|---|---|---|
| 4,751,658 A * | 6/1988 | Kadonoff et al. | 701/301 |
| 5,155,775 A * | 10/1992 | Brown | 382/153 |
| 6,678,394 B1 | 1/2004 | Nichani | |
| 6,778,180 B2 | 8/2004 | Howard et al. | |
| 7,162,056 B2 | 1/2007 | Burl et al. | |
| 7,610,146 B2 | 10/2009 | Breed | |
| 7,689,321 B2 | 3/2010 | Karlsson | |
| 7,742,640 B1 | 6/2010 | Carlson et al. | |
| 7,769,205 B2 | 8/2010 | Arias-Estrada et al. | |
| 7,782,361 B2 * | 8/2010 | Kotake et al. | 348/207.99 |
| 7,899,616 B2 | 3/2011 | Breed | |
| 8,078,400 B2 * | 12/2011 | Meyer | 701/431 |
| 2004/0076324 A1 | 4/2004 | Burl et al. | |
| 2006/0017720 A1 | 1/2006 | Li | |
| 2007/0032912 A1 | 2/2007 | Jung et al. | |
| 2007/0085859 A1 * | 4/2007 | Xie | 345/619 |
| 2008/0279421 A1 | 11/2008 | Hamza et al. | |
| 2009/0030605 A1 | 1/2009 | Breed | |
| 2009/0037106 A1 | 2/2009 | Gavriline et al. | |

(Continued)

OTHER PUBLICATIONS

Batlle et al., "Recent Progress in Coded Structured Light as a Technique to Solve the Correspondence Problem: A Survey", "Pattern Recognition", 1998, pp. 963-982, vol. 31, No. 7, Publisher: Elseview Science Ltd., Published in: UK.

(Continued)

*Primary Examiner* — Fadey Jabr
*Assistant Examiner* — Paula L Schneider
(74) *Attorney, Agent, or Firm* — Fogg & Powers LLC

(57) ABSTRACT

A navigation system includes host and remote units. Host unit includes positioning device to determine absolute position/orientation of host unit; first communication device to communicate signals; first processor; and first memory. Remote unit includes second communication device to receive signals from first communication device; second processor; and second memory. First or second processor compares first aspects of known pattern with second aspects of image of captured pattern positioned on surface at either host unit or remote unit. First or second processor determines relative position/orientation of remote unit relative to host unit based on comparison of first aspects and second aspects. First or second processor determines absolute position/orientation of remote unit based on relative position/orientation of remote unit relative to host unit and absolute position/orientation of host unit. Either absolute position/orientation of host unit or absolute position/orientation of remote unit are communicated from host unit to remote unit.

20 Claims, 9 Drawing Sheets

(56) References Cited

U.S. PATENT DOCUMENTS

| | | |
|---|---|---|
| 2009/0048750 A1 | 2/2009 | Breed |
| 2009/0092284 A1 | 4/2009 | Breed et al. |
| 2009/0115779 A1* | 5/2009 | Shulman et al. ............... 345/419 |
| 2009/0118890 A1* | 5/2009 | Lin et al. ........................ 701/28 |
| 2009/0140887 A1 | 6/2009 | Breed et al. |
| 2009/0212157 A1 | 8/2009 | Arlton et al. |
| 2009/0251366 A1 | 10/2009 | McClure et al. |
| 2009/0276105 A1 | 11/2009 | Lacaze et al. |
| 2010/0052945 A1 | 3/2010 | Breed |
| 2010/0169009 A1 | 7/2010 | Breed et al. |
| 2010/0268458 A1 | 10/2010 | Becker et al. |
| 2010/0274481 A1 | 10/2010 | Krishnaswamy et al. |
| 2011/0163908 A1 | 7/2011 | Andersson et al. |

OTHER PUBLICATIONS

Borenstein et al., "Where Am I? Sensors and Methods for Mobile Robot Positioning", Apr. 1996, pp. 1-282.

* cited by examiner

USING STRUCTURED LIGHT TO UPDATE INERTIAL NAVIGATION SYSTEMS

BACKGROUND

Various systems have been developed to provide position, velocity, and/or attitude information to a user. Inertial based navigation systems (INS) that track changes in position and attitude from an initial point are capable of providing position, velocity, and/or attitude information that is accurate and low in noise. However, depending on the quality of sensor used, INS may suffer from excessive position drift over time. In addition, initial point information may not be readily available at all times, so determination of a navigation solution relative to an absolute frame of reference (such as the earth) may not be possible. Radio based systems, including satellite navigation systems such as global navigation satellite systems (GNSS) (for example, global positioning system (GPS)), are capable of providing low drift information, but the data tends to be noisy and subject to radio propagation error such as multipath. In certain environments, such as urban canyons, radio propagation paths may be completely blocked, rendering satellite navigation system information completely unavailable for extended periods of time.

For high performance applications, INS and satellite navigation systems may be combined into a single system to produce a navigator that demonstrates a low noise and low drift navigation solution relative to an earth reference frame. However, urban environments usually have situations that limit the availability of the satellite navigation system information (e.g. urban canyons), rendering an INS/satellite navigation system inadequate for high performance applications. One solution to the blockage problem is to erect a local radio network whose elements have access to absolute position data. The network can be used to supply position information to a user via triangulation. However, a local radio network capable of providing a 3D solution requires three radio transmitters, requiring a significant infrastructure and access to absolute position at three separate points.

SUMMARY

A navigation system includes a host unit and a remote unit. The host init includes a positioning device operable to determine a first absolute position and/or orientation of the host unit; a first communication device operable to communicate signals; a first processor; and a first memory. The remote unit includes a second communication device operable to receive the signals from the first communication device; a second processor; and a second memory. Either the first processor or the second processor is operable to compare first aspects of a known pattern with second aspects of an image of a captured pattern positioned on a surface at either the host unit or the remote unit. Either the first processor or the second processor is operable to determine a relative position and/or orientation of the remote unit relative to the host unit based on the comparison of the first aspects and the second aspects. Either the first processor or the second processor is operable to determine a second absolute position and/or orientation of the remote unit based on the relative position and/or orientation of the remote unit relative to the host unit and the first absolute position and/or orientation of the host unit. Either the first absolute position and/or orientation or the second absolute position and/or orientation are communicated from the host unit to the remote unit.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout the figures and text.

DETAILED DESCRIPTION

Figure 1A:
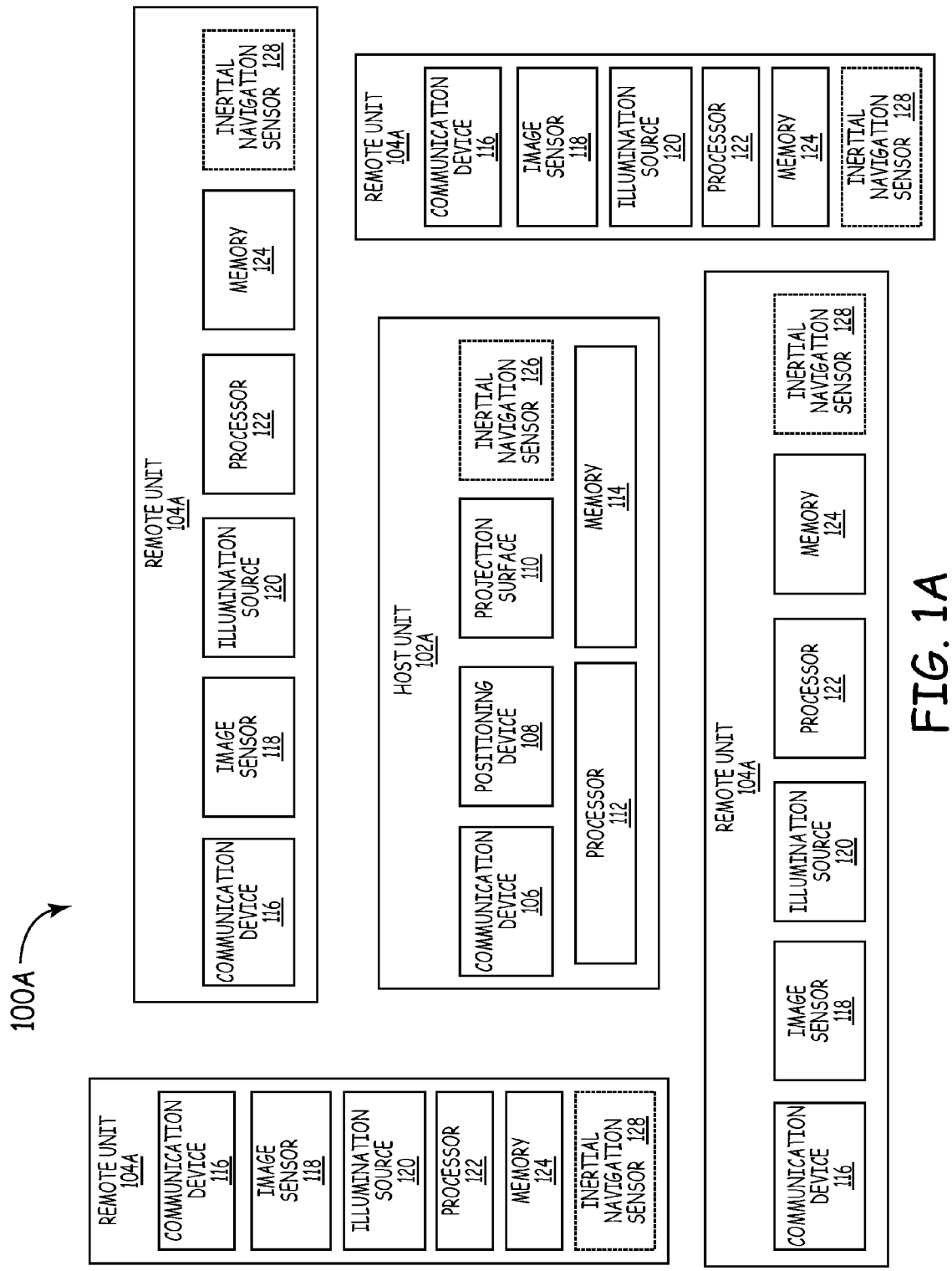
FIGS. 1A-1D are block diagrams depicting exemplary embodiments of collaborative navigation systems using optical pattern analysis to determine relative locations between a host unit and a remote unit.

In the following detailed description, reference is made to the accompanying drawings that form a part hereof, and in which is shown by way of illustration specific illustrative embodiments. However, it is to be understood that other exemplary embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present invention provide systems and methods for collaborative navigation systems that use optical pattern analysis to determine relative locations between a host unit and remote units. More specifically, robotic vision systems are used to analyze images of optical patterns to determine the relative location and/or relative orientation between the host unit and remote units. The host unit also has navigation systems enabling it to determine its absolute location and/or orientation. Thus, the locations and/or orientations of the remote units can be determined using the absolute location and/or orientation of the host unit in combination with the relative locations and/or orientations between the remote units and the host unit. In exemplary embodiments, the absolute and relative locations and/or orientations are in three-dimensional space. In other exemplary embodiments, the absolute and relative locations and/or orientations are in two-dimensional space to simplify the measurements and calculations. In these exemplary embodiments that are in two-dimensional space, the Z-dimension of the positions and orientations are not as important because the majority of the movement is occurring on an X,Y plane.

FIGS. 1A-1D are block diagrams depicting exemplary embodiments of collaborative navigation systems 100 using optical pattern analysis to determine relative locations between a host unit and remote units. Each of FIGS. 1A-1D illustrates a different embodiment of collaborative navigation systems 100, labeled 100A-100D respectively.

FIG. 1A is a block diagram depicting an exemplary embodiment of a collaborative navigation system 100A using structured lighting pattern analysis at a remote unit. Exemplary collaborative navigation system 100A includes a host unit 102A and a plurality of remote units 104A. While four remote units 104A are shown in FIG. 1A, other exemplary embodiments of system 100A include greater or fewer remote units 104A. In some exemplary embodiments, only a single remote unit 104A is included in system 100A.

Host unit 102A includes a communication device 106, a positioning device 108, a projection surface 110, a processor 112, and a memory 114. Communication device 106 is operable to communicate with respective communications devices in the remote units 104A described below. In exemplary embodiments, the communications device includes a radio frequency (RF) radio and antenna, such as, but not limited to, a short range radio transceiver or a mobile telephone transceiver. The communication device 106 is operable to communicate data to/from similar communication devices on the remote units 104A.

Positioning device 108 is operable to determine an absolute position and/or orientation of the host unit 102A. In exemplary embodiments, the positioning device 108 includes a satellite based navigation system, such as global navigation satellite systems (GNSS) (for example, global positioning system (GPS)). In other exemplary embodiments, the positioning device 108 includes terrestrial radio navigation systems, such as systems implementing Long Range Navigation (LORAN) or Very High Frequency Omnidirectional Range (VOR) and Distance Measuring Equipment (DME), or other low frequency radio transmissions used for navigation. While, the source of the absolute position determined by the positioning device 108 is not required to be any one positioning or navigation system, it is desirable that the absolute position determined by the positioning device 108 is accurate and precise.

Projection surface 110 is a surface which allows projection of a structured light pattern. In exemplary embodiments, projection surface 110 is substantially flat. In exemplary embodiments, the projection surface 110 is a predefined physical structure that would result in a predefined geo-location and unique lighting structure which can be easily detected by an image sensor (such as image sensor 118 described below). In exemplary embodiments, projection surface 110 is painted a specific color or shade to reduce interference or distortion of the structured light pattern. In exemplary embodiments, as will be described below, the structured light pattern is projected onto the projection surface 110 using an infrared or other non-visible light source.

Processor 112 is communicatively coupled to the communication device 106 and the positioning device 108 and is used to control these devices and/or process data received from these devices. Memory 114 is communicatively coupled to processor 112 and is used to store program instructions for execution on processor 112 and is also used to store data received from communication device 106 and/or positioning device 108.

Processor 112 is operable to cause communication device 106 to transmit the absolute position and/or orientation of the host unit 102A received from the positioning device 108 to the remote units 104A.

Remote units 104A each include a communication device 116, an image sensor 118, an illumination source 120, a processor 122, and a memory 124. Communication device 116 is operable to communicate data to/from the communication device 106 of the host unit 102A. As with the communication device 106, in exemplary embodiments, the communications device 116 includes a radio frequency (RF) radio and antenna, such as, but not limited to, a short range radio transceiver or a mobile telephone transceiver. In exemplary embodiments, each remote unit 104A includes the same type of communication device. In other exemplary embodiments, host unit 102A includes multiple communications devices 106 of different types that are each configured to communicate with a different subset of remote units 104A, each having a complimentary communication device 116 configured to communicate with an associated communication device 106 of the host unit 102A.

Image sensor 118 is used to capture images of structured light patterns projected on the projection surface 110 of the host unit 102A. Illumination source 120 is used to project structured light patterns onto the projection surface 110 of the host unit 102A. In other exemplary embodiments, the structured light patterns are projected onto the projection surface 110 from another remote unit 104A or from another source. The projection and image capture of the structured light patterns onto projection surfaces is described in detail below with reference to FIG. 2A. In other exemplary embodiments, described in detail below with reference to FIG. 1C-1D, the patterns are not structured light, but are instead painted onto a surface of the host unit 102A.

Processor 122 is communicatively coupled to the communication device 116, the image sensor 118, and the illumination source 120 and is used to control these devices and/or process data received from these devices. Memory 124 is communicatively coupled to processor 122 and is used to store program instructions for execution on processor 122 and is also used to store data received from communication device 116, image sensor 118, and/or illumination source 120.

Processor 122 is operable to compare aspects of the images of the structured light patterns projected onto the projection surface 110 of the host unit 102A with aspects of a predetermined pattern. The predetermined pattern is the pattern that is being transmitted on the projection surface 110 of the host unit 102A. The predetermined pattern is distorted and/or deformed as it is projected onto the projection surface 110 by the position and/or orientation of the projection surface 110 of the host unit 102A. Aspects that may be compared between the images and the predetermined pattern may be the size and position of elements in the pattern, the distance between elements of the pattern, or the distortion of elements of the pattern based on the angle of the projection surface 110 with respect to the image sensor 118 and/or the illumination source 120. This will be described in more detail with reference to FIG. 2A and FIG. 3 below.

In exemplary embodiments, pattern recognition is used to determine the relative position and relative orientation between the image sensor 118 at the remote unit 104A and the pattern on the projection surface 110 at the host unit 102A. In these exemplary embodiments, calculations are performed to determine how the pattern in the captured image is scaled, skewed, and translated from the predetermined pattern. The determination of how the image is scaled, skewed, and translated is used to determine the relative location and/or orientation between the image sensor 118 and the pattern on the projection surface 110.

In other exemplary embodiments, at least one predefined distorted pattern is registered a priori as associated to a predefined distance and/or angle between the host unit 102A and remote units 104A. In exemplary embodiments, there are a number of predefined distorted patterns registered a priori as associated to various distances and/or angles between the host and remote units. In these embodiments, the remote unit 104A moves around until a pattern captured by the image sensor 118 matches one of the predefined distorted patterns that were registered a priori. In exemplary embodiments, an exact match is not necessary and matching within a threshold constitutes a match. In other embodiments, the host unit 104A moves around until a pattern captured by the image sensor 118 matches one of the predefined distorted patterns that were registered a priori. In exemplary embodiments, an exact match is not necessary and matching within a threshold constitutes a match. In exemplary embodiments, this pattern matching is less computationally intensive than pattern recognition techniques.

Processor 122 determines at least one of a relative position and a relative orientation of each remote unit 104A relative to the host unit 102A based on the comparison of the aspects of the images of the structured light patterns with the aspects of the predetermined pattern. Processor 124 further determines at least one of an absolute position and/or absolute orientation of the remote unit 104A based on the relative position and/or relative orientation of the remote unit 104A relative to the host unit 102A and the absolute position and/or absolute orientation of the host unit 102A.

In exemplary embodiments, relative X, Y, and Z coordinates between each remote unit 104A and the host unit 102A are summed to absolute X, Y, and Z coordinates of the host unit 102A to obtain the absolute X, Y, and Z coordinates of the particular remote unit 104A. In other exemplary embodiments, since the movement is on a surface, the relative position of the remote unit 104A relative to the host unit 102A can be simplified to two-dimensional space (two distances on the X and Y axes).

In exemplary embodiments, the relative orientation of the remote unit 104A relative to the host unit 102A is represented by relative roll, pitch, and heading (three relative rotations about the X, Y, and Z axes). Similarly, the absolute orientation of the host unit 102A is represented by absolute roll, pitch, and heading (three absolute rotations about the X, Y, and Z axes). In exemplary embodiments, the relative roll, pitch, and heading for the remote unit 104A relative to the host unit 102A are summed with the absolute roll, pitch, and heading for the host unit 102A to obtain the absolute roll, pitch, and heading for the remote unit 104A (absolute rotations about the X, Y, and Z axes of the remote unit 104A), which represents the absolute orientation of the remote unit 104A. In other exemplary embodiments, since the movement is on a surface, the relative orientation of the remote unit 104A relative to the host unit 102A can be simplified to two-dimensional space (two relative rotations about the X and Y axes).

In exemplary embodiments, the exemplary collaborative navigation system 100A also includes inertial navigation sensors or other inertial navigation units that estimate the position and/or orientation in satellite navigation denied environments. The position estimates are periodically updated when satellite navigation information is available at the host unit and/or when both satellite navigation information is available at the host unit and the relative position and/or orientation information is calculated between the host unit and the remote unit.

Specifically, in some exemplary embodiments, host unit 102A includes inertial navigation sensor 126 that estimates the position and/or orientation of the host unit 102A. In some implementations, processor 112 also implements a Kalman filter (or other estimator) to provide a navigation state update from information received from the positioning device 108, when available, to the position and/or orientation estimates to reduce accumulated navigation errors and to calibrate the inertial navigation sensor 126. In other exemplary embodiments, other types of sensor data is fused together or provided with navigation state updates by a Kalman filter (or other estimator) implemented by processor 112.

Additionally, in some exemplary embodiments, each remote unit 104A includes an inertial navigation sensor 128 that estimates the position and/or orientation of the remote unit 104A. In some implementations, processor 122 also implements a Kalman filter (or other estimator) to provide a navigation state update based on the absolute position and/or orientation calculated for the remote units 104A using the image capture and analysis described above. This navigation state update is provided to the Kalman filter's (or other estimator's) position and/or orientation estimates to reduce accumulated navigation errors and to calibrate the inertial sensor 128. In other exemplary embodiments, other types of sensor data is fused together or provided with navigation state updates by a Kalman filter (or other estimator) implemented by processor 112.

In exemplary embodiments, there are times when the positioning device 108 does not have current absolute position and/or orientation information for the host unit 102A, such as when the positioning device is a GNSS (for example, GPS) and a GNSS signal is not available. During these times of GNSS (for example, GPS) denied navigation, the system could use a recursive approach to determine the absolute position and/or orientation of the host unit 102A. In exemplary embodiments using a recursive approach, the host unit 102A moves to a position of one of the remote units 104A that was previously determined. Once the host unit 102A assumes the previous position of the remote unit 104A, the host unit sets its current position to be the position previously determined by the host unit for the remote unit 104A. The remote unit 104A can then be deployed using the host unit's knowledge of its absolute position as reference. Once the remote unit 104A has its new position calculated, the host unit 102A could then move to the new position of remote unit 104A and set its current location to be the position previously determined by the host unit for the remote unit 104A. This recursive approach of determination of remote unit location and the host unit 102A assuming the position of remote unit 104A can be repeated indefinitely. In exemplary embodiments, once the GNSS/GPS signal comes back, the host unit 104A can resume normal operation as before without relying on the recursive approach. In exemplary embodiments, once the GNSS/GPS signal comes back (or the other positioning signal provided by the positioning device 108), the position determined by the GNSS/GPS receiver (or other positioning device 108) can be used as a state update for a Kalman filter or other state estimator.

Figure 1B:
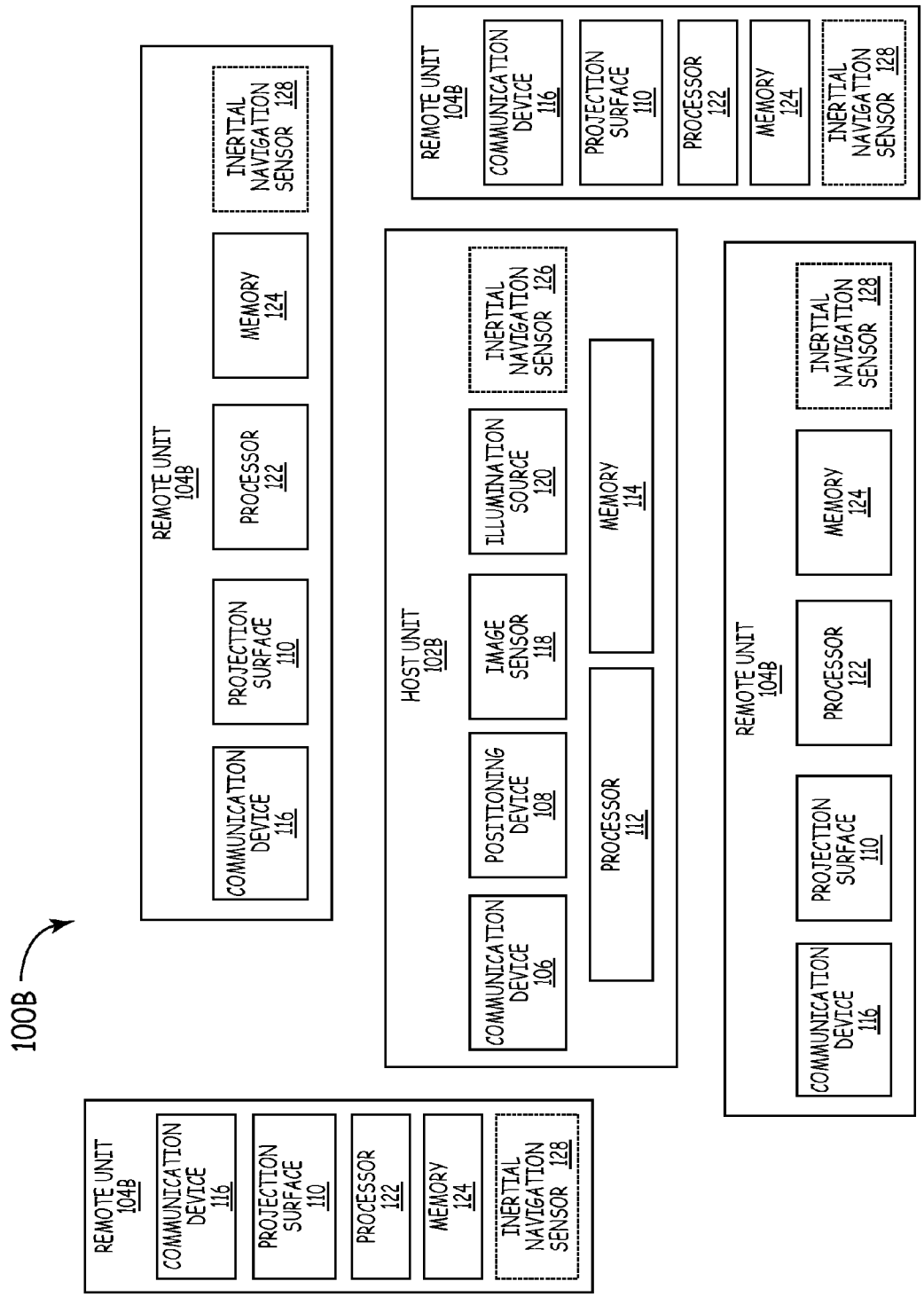

FIG. 1B is a block diagram depicting an exemplary embodiment of a collaborative navigation system 100B using structured lighting pattern analysis at a host unit. System 100B includes similar components to system 100A and operates according to similar principles and methods as system 100A described above. The primary difference between system 100B and system 100A is that in system 100B the host unit 102B has the image sensor 118 and the illumination source 120 and the remote units 104B have the projection surfaces 110 instead of the opposite configuration of system 100A. Exemplary collaborative navigation system 100B includes a host unit 102B and a plurality of remote units 104B. While four remote units 104B are shown in FIG. 1A, other exemplary embodiments of system 100B include greater or fewer remote units 104B. In some exemplary embodiments, only a single remote unit 104B is included in system 100B.

Host unit 102B includes the same components as host unit 102A, except for host unit 102B includes the image sensor 118 and the illumination source 120 instead of the projection surface 110. Similarly, remote units 104B include all the same components as remote units 104B, except for remote units 104B include the projection surface 110 instead of the image sensor 118 and the illumination source 120.

The components of host unit 102B that are also in host unit 102A operate according to their description above. Specifically, host unit 102B includes a communication device 106, a positioning device 108, a processor 112, and a memory 114. Each of communication device 106, positioning device 108, processor 112, and memory 114 operate according to their description with reference to FIG. 1A above.

Image sensor 118 is used to capture images of structured light patterns projected on the projection surfaces 110 of each of the remote units 104B. Illumination source 120 is used to project structured light patterns onto the projection surfaces 110 of each of the remote units 104B. In exemplary embodiments, multiple image sensors 118 and/or illumination sources 120 are positioned at the host unit 102B to enable image capture and illumination of the plurality of projection surfaces 110 on the plurality of remote units 104B. In other exemplary embodiments, the structured light patterns are projected onto the projection surfaces 110 from another remote unit 104B or from another source. The projection and image capture of the structured light patterns onto projection surfaces is described in detail below with reference to FIG. 2A. In other exemplary embodiments described below, the patterns are not structured light, but are instead painted onto surfaces of the remote units 104B.

Processor 112 is communicatively coupled to the communication device 106, the positioning device 108, the image sensor 118, and the illumination source 120 and is used to control these devices and/or process data received from these devices. Memory 114 is communicatively coupled to processor 112 and is used to store program instructions for execution on processor 112 and is also used to store data received from communication device 106, positioning device 108, image sensor 118, and/or illumination source 120.

Processor 112 is operable to compare aspects of the images of the structured light patterns projected onto the projections surface 110 of the remote unit 104B with aspects of a predetermined pattern. The predetermined pattern is the pattern that is being projected onto the projection surface 110 of the remote units 104B. The predetermined pattern is distorted and/or deformed as it is projected onto the projection surface 110 by the position and/or orientation of the projection surface 110 of the remote units 104B. Aspects that may be compared between the images and the predetermined pattern may be the size of elements in the pattern, the distance between elements of the pattern, or the distortion of elements of the pattern based on the angle of the projection surface 110 with respect to the image sensor 118 and/or the illumination source 120. This will be described in more detail with reference to FIG. 2A and FIG. 3 below.

In exemplary embodiments, pattern recognition is used to determine the relative position and relative orientation between the image sensor 118 at the host unit 102B and the pattern on the projection surface 110 at the projection unit 104B. In these exemplary embodiments, calculations are performed to determine how the pattern in the captured image is scaled, skewed, and translated from the predetermined pattern. The determination of how the image is scaled, skewed, and translated is used to determine the relative location and/or orientation between the image sensor 118 and the pattern on the projection surface 110.

In other exemplary embodiments, at least one predefined distorted pattern is registered a priori as associated to a predefined distance and/or angle between the host unit 102B and remote units 104B. In exemplary embodiments, there are a number of predefined distorted patterns registered a priori as associated to various distances and/or angles between the host and remote units. In these embodiments, the remote unit 104B moves around until a pattern captured by the image sensor 118 matches one of the predefined distorted patterns that were registered a priori. In exemplary embodiments, an exact match is not necessary and matching within a threshold constitutes a match. In other embodiments, the host unit 104B moves around until a pattern captured by the image sensor 118 matches one of the predefined distorted patterns that were registered a priori. In exemplary embodiments, an exact match is not necessary and matching within a threshold constitutes a match. In exemplary embodiments, this pattern matching is less computationally intensive than pattern recognition techniques.

Processor 112 determines at least one of a relative position and a relative orientation of each remote unit 104B relative to the host unit 102B based on the comparison of the aspects of the images of the structured light patterns with the aspects of the predetermined pattern. Processor 112 further determines at least one of an absolute position and/or absolute orientation of the remote units 104B based on the relative position and/or relative orientation of the remote unit 104B relative to the host unit 104B and the absolute position and/or absolute orientation of the host unit 102B.

In exemplary embodiments, relative X, Y, and Z coordinates between the remote unit 104B and the host unit 102B are summed to absolute X, Y, and Z coordinates of the host unit 102B to obtain the absolute X, Y, and Z coordinates of each remote unit 104B. In other exemplary embodiments, since the movement is on a surface, the relative position of the remote unit 104B relative to the host unit 102B can be simplified to two-dimensional space (two distances on the X and Y axes).

In exemplary embodiments, the relative orientation of each remote unit 104B relative to the host unit 102B is represented by relative roll, pitch, and heading (three relative rotations about the X, Y, and Z axes). Similarly, the absolute orientation of the host unit 102B is represented by absolute roll, pitch, and heading (three absolute rotations about the X, Y, and Z axes). In exemplary embodiments, the relative roll, pitch, and heading for a remote unit 104B relative to the host unit 102B are summed with the absolute roll, pitch, and heading for the host unit 102B to obtain the absolute roll, pitch, and heading for the remote unit 104B (absolute rotations about the X, Y, and Z axes of the remote unit 104B), which represents the absolute orientation of the remote unit 104B. In other exemplary embodiments, since the movement is on a surface, the relative orientation of the remote unit 104B relative to the host unit 102B can be simplified to two-dimensional space (two relative rotations about the X and Y axes).

In exemplary embodiments, the absolute position and/or orientation of the remote units 104B are calculated at the processor 112 of the host unit 102B. The absolute position and/or orientation of each remote unit 104B is then transmitted to each remote unit 104B from the host unit 102B using the communication device 106.

In exemplary embodiments, the absolute position and/or orientation of the remote units 104B are calculated at each respective processor 122 after both (1) the relative position and/or orientation between the host unit 102B and each respective remote unit 104B; and (2) the absolute position and/or orientation of the host unit 102B are communicated to the respective remote unit 104B from the host unit 102B using communication device 106 and communication device 116.

In exemplary embodiments, the exemplary collaborative navigation system 100B also includes inertial navigation sensors or other inertial navigation units that estimate the position and/or orientation in satellite navigation denied environments. The position estimates are periodically updated when satellite navigation information is available at the host unit and/or when both satellite navigation information is available at the host unit and the relative position and/or orientation information is calculated between the host unit and the remote unit.

Specifically, in some exemplary embodiments, host unit 102B includes inertial navigation sensor 126 that estimates the position and/or orientation of the host unit 102B. In some implementations, processor 112 also implements a Kalman filter (or other estimator) to provide a navigation state update from information received from the positioning device 108, when available, to the position and/or orientation estimates to reduce accumulated navigation errors and to calibrate the inertial navigation sensor 126. In other exemplary embodiments, other types of sensor data is fused together or provided with navigation state updates by a Kalman filter (or other estimator) implemented by processor 112.

Additionally, in some exemplary embodiments, each remote unit 104B includes an inertial navigation sensor 128 that estimates the position and/or orientation of the remote unit 104B. In some implementations, processor 122 also implements a Kalman filter (or other estimator) to provide a navigation state update based on the absolute position and/or orientation calculated for the remote units 104B using the image capture and analysis described above. This navigation state update is provided to the Kalman filter's (or other estimator's) position and/or orientation estimates to reduce accumulated navigation errors and to calibrate the inertial sensor 128. In other exemplary embodiments, other types of sensor data is fused together or provided with navigation state updates by a Kalman filter (or other estimator) implemented by processor 112.

In exemplary embodiments, there are times when the positioning device 108 does not have current absolute position and/or orientation information for the host unit 102B, such as when the positioning device is a GNSS (for example, GPS) and a GNSS signal is not available. During these times of GNSS (for example, GPS) denied navigation, the system could use a recursive approach to determine the absolute position and/or orientation of the host unit 102B. In exemplary embodiments using a recursive approach, the host unit 102B moves to a position of one of the remote units 104B that was previously determined. Once the host unit 102B assumes the previous position of the remote unit 104B, the host unit sets its current position to be the position previously determined by the host unit for the remote unit 104B. The remote unit 104B can then be deployed using the host unit's knowledge of its absolute position as reference. Once the remote unit 104B has its new position calculated, the host unit 102B could then move to the new position of remote unit 104B and set its current location to be the position previously determined by the host unit for the remote unit 104B. This recursive approach of determination of remote unit location and the host unit 102B assuming the position of remote unit 104B can be repeated indefinitely. In exemplary embodiments, once the GNSS/GPS signal comes back, the host unit 104B can resume normal operation as before without relying on the recursive approach. In exemplary embodiments, once the GNSS/GPS signal comes back (or the other positioning signal provided by the positioning device 108), the position determined by the GNSS/GPS receiver (or other positioning device 108) can be used as a state update for a Kalman filter or other state estimator.

Figure 1C:
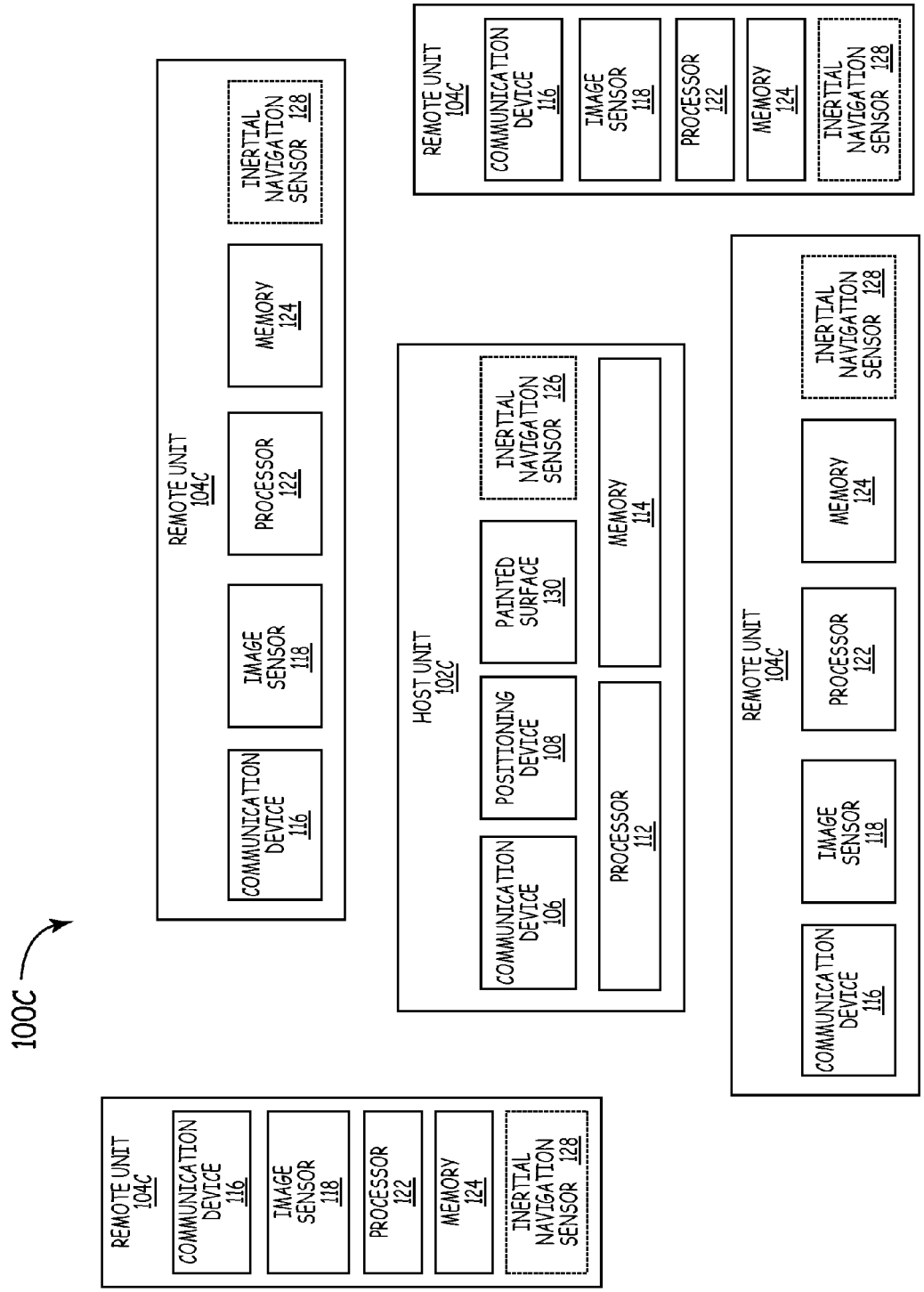

FIG. 1C is a block diagram depicting an exemplary embodiment of a collaborative navigation system 100C using pattern analysis at a remote unit. System 100C includes similar components to system 100A and operates according to similar principles and methods as system 100A described above. The primary difference between system 100C and system 100A is that system 100C uses painted patterns instead of structure light patterns projected onto surfaces. Exemplary collaborative navigation system 100C includes a host unit 102C and a plurality of remote units 104C. While four remote units 104C are shown in FIG. 1C, other exemplary embodiments of system 100C include greater or fewer remote units 104C. In some exemplary embodiments, only a single remote unit 104C is included in system 100C.

Host unit 102C includes all the same components as host unit 102A, except for host unit 102C includes a painted surface 130 instead of including a projection surface 110. Similarly, remote units 104C include all the same components as remote units 104A, except for remote units 104C do not include illumination source 120 because the patterns are not projected and are instead integrated into painted surface 130.

The components of host unit 102C that are also in host unit 102A operate according to their description above. Specifically, host unit 102C includes a communication device 106, a positioning device 108, a painted surface 130, a processor 112, and a memory 114. Each of communication device 106, positioning device 108, processor 112, and memory 114 operate according to their description with reference to FIG. 1A above.

Painted surface 130 of host unit 102C is similar to projection surface 110 of host unit 102A. The primary difference between painted surface 130 and projection surface 110 is that painted surface 130 includes painted patterns that are integrated into painted surface 130 in contrast to projection surface 110 operable to have structured light patterns projected onto it. In exemplary embodiments, painted surface 130 is substantially flat. In exemplary embodiments, the painted surface 130 is a specific structured surface that constitutes a specific recognized pattern when processed by the image sensor 118 as described below. In exemplary embodiments, the patterns are painted onto painted surface 130 using specific contrasting colors or shades to enable the most accurate image analysis of the painted pattern. In exemplary embodiments, the painted patterns are not visible to the eye and require infrared image sensors or other non-visible light image sensors to capture images of the patterns. In exemplary embodiments, instead of painted patterns, the patterns are created through other processes, such as by engraving, scraping, positioning objects, removing or adding material to a surface, or through other ways that could be distinguished, recognized, and/or matched by a robotic vision system.

The components of each remote unit 104C that are also used in each remote unit 104A operate according to their description above. Specifically, each remote unit 104C includes a communication device 116, an image sensor 118, a processor 122, and a memory 124. Each of communication device 116, processor 122, and memory 124 operate according to their description with reference to FIG. 1A above.

Image sensor 118 of remote unit 104C is configured to capture images of painted patterns integrated into painted surface 130. Because image sensor 118 is configured to capture images of painted patterns integrated into painted surface 130 instead of a projected structured light pattern on a projection surface 110, remote units 104C do not include illumination sources 120 to project structured light patterns. In other exemplary embodiments, other illumination sources are used to improve the environment lux level for the image sensor 118 for times of low or other non-ideal lighting, without projecting structured light patterns.

Processor 122 operates as described above to compare aspects of the images of the patterns to aspects of a predetermined pattern. The predetermined pattern is the pattern that is painted onto the painted surface 130. The image of the predetermined pattern is distorted and/or deformed by the position and/or orientation of the painted surface 130 in the images captured by image sensor 118. Aspects that may be compared between the images and the predetermined pattern may be the size of elements in the pattern, the distance between elements of the pattern, or the distortion of elements of the pattern based on the angle and/or rotation of the painted surface 130 with respect to the image sensor 118. This will be described in more detail with reference to FIG. 2B and FIG. 3 below.

In exemplary embodiments, pattern recognition is used to determine the relative position and relative orientation between the image sensor 118 at the remote unit 104C and the pattern on the painted surface 130 at the host unit 102C. In these exemplary embodiments, calculations are performed to determine how the pattern in the captured image is scaled, skewed, and translated from the predetermined pattern. The determination of how the image is scaled, skewed, and translated is used to determine the relative location and/or orientation between the image sensor 118 and the pattern on the painted surface 130.

In other exemplary embodiments, at least one predefined distorted pattern is registered a priori as associated to a predefined distance and/or angle between the host unit 102C and remote units 104C. In exemplary embodiments, there are a number of predefined distorted patterns registered a priori as associated to various distances and/or angles between the host and remote units. In these embodiments, the remote unit 104C moves around until a pattern captured by the image sensor 118 matches one of the predefined distorted patterns that were registered a priori. In exemplary embodiments, an exact match is not necessary and matching within a threshold constitutes a match. In other embodiments, the host unit 104C moves around until a pattern captured by the image sensor 118 matches one of the predefined distorted patterns that were registered a priori. In exemplary embodiments, an exact match is not necessary and matching within a threshold constitutes a match. In exemplary embodiments, this pattern matching is less computationally intensive than pattern recognition techniques.

Based on the comparison of aspects in the images to the predetermined pattern, processor 122 determines a relative position and/or relative orientation of the remote unit 104C relative to the host unit 102C as described above. Based on the relative position and/or relative orientation of the remote unit 104C relative to the host unit 102C, processor 124 further determines at least one of an absolute position and/or absolute orientation of the remote unit 104C based on the relative position and/or relative orientation of the remote unit 104C and the absolute position and/or absolute orientation of the host unit 102C.

In exemplary embodiments, relative X, Y, and Z coordinates between the remote unit 104C and the host unit 102C are summed to absolute X, Y, and Z coordinates of the particular remote unit 104C. In other exemplary embodiments, since the movement is on a surface, the relative position of the remote unit 104C relative to the host unit 102C can be simplified to two-dimensional space (two distances on the X and Y axes).

In exemplary embodiments, the relative orientation of the remote unit 104C relative to the host unit 102C is represented by relative roll, pitch, and heading (three relative rotations about the X, Y, and Z axes). Similarly, the absolute orientation of the host unit 102A is represented by absolute roll, pitch, and heading (three absolute rotations about the X, Y, and Z axes). In exemplary embodiments, the relative roll, pitch, and heading for the remote unit 104C relative to the host unit 102C are summed with the absolute roll, pitch, and heading for the host unit 102C to obtain the absolute roll, pitch, and heading for the remote unit 104C (absolute rotations about the X, Y, and Z axes of the remote unit 104C), which represents the absolute orientation of the remote unit 104C. In other exemplary embodiments, since the movement is on a surface, the relative orientation of the remote unit 104C relative to the host unit 102C can be simplified to two-dimensional space (two relative rotations about the X and Y axes).

In exemplary embodiments, the exemplary collaborative navigation system 100C also includes inertial navigation sensors or other inertial navigation units that estimate the position and/or orientation in satellite navigation denied environments. The position estimates are periodically updated when satellite navigation information is available at the host unit and/or when both satellite navigation information is available at the host unit and the relative position and/or orientation information is calculated between the host unit and the remote unit.

Specifically, in some exemplary embodiments, host unit 102C includes inertial navigation sensor 126 that estimates the position and/or orientation of the host unit 102C. In some implementations, processor 112 also implements a Kalman filter (or other estimator) to provide a navigation state update from information received from the positioning device 108, when available, to the position and/or orientation estimates to reduce accumulated navigation errors and to calibrate the inertial navigation sensor 126. In other exemplary embodiments, other types of sensor data is fused together or provided with navigation state updates by a Kalman filter (or other estimator) implemented by processor 112.

Additionally, in some exemplary embodiments, each remote unit 104C includes an inertial navigation sensor 128 that estimates the position and/or orientation of the remote unit 104C. In some implementations, processor 122 also implements a Kalman filter (or other estimator) to provide a navigation state update based on the absolute position and/or orientation calculated for the remote units 104C using the image capture and analysis described above. This navigation state update is provided to the Kalman filter's (or other estimator's) position and/or orientation estimates to reduce accumulated navigation errors and to calibrate the inertial sensor 128. In other exemplary embodiments, other types of sensor data is fused together or provided with navigation state updates by a Kalman filter (or other estimator) implemented by processor 112.

In exemplary embodiments, there are times when the positioning device 108 does not have current absolute position and/or orientation information for the host unit 102C, such as when the positioning device is a GNSS (for example, GPS) and a GNSS signal is not available. During these times of GNSS (for example, GPS) denied navigation, the system could use a recursive approach to determine the absolute position and/or orientation of the host unit 102C. In exemplary embodiments using a recursive approach, the host unit 102C moves to a position of one of the remote units 104C that was previously determined. Once the host unit 102C assumes the previous position of the remote unit 104C, the host unit sets its current position to be the position previously determined by the host unit for the remote unit 104C. The remote unit 104C can then be deployed using the host unit's knowledge of its absolute position as reference. Once the remote unit 104C has its new position calculated, the host unit 102C could then move to the new position of remote unit 104C and set its current location to be the position previously determined by the host unit for the remote unit 104C. This recursive approach of determination of remote unit location and the host unit 102C assuming the position of remote unit 104C can be repeated indefinitely. In exemplary embodiments, once the GNSS/GPS signal comes back, the host unit 104C can resume normal operation as before without relying on the recursive approach. In exemplary embodiments, once the GNSS/GPS signal comes back (or the other positioning signal provided by the positioning device 108), the position determined by the GNSS/GPS receiver (or other positioning device 108) can be used as a state update for a Kalman filter or other state estimator.

Figure 1D:
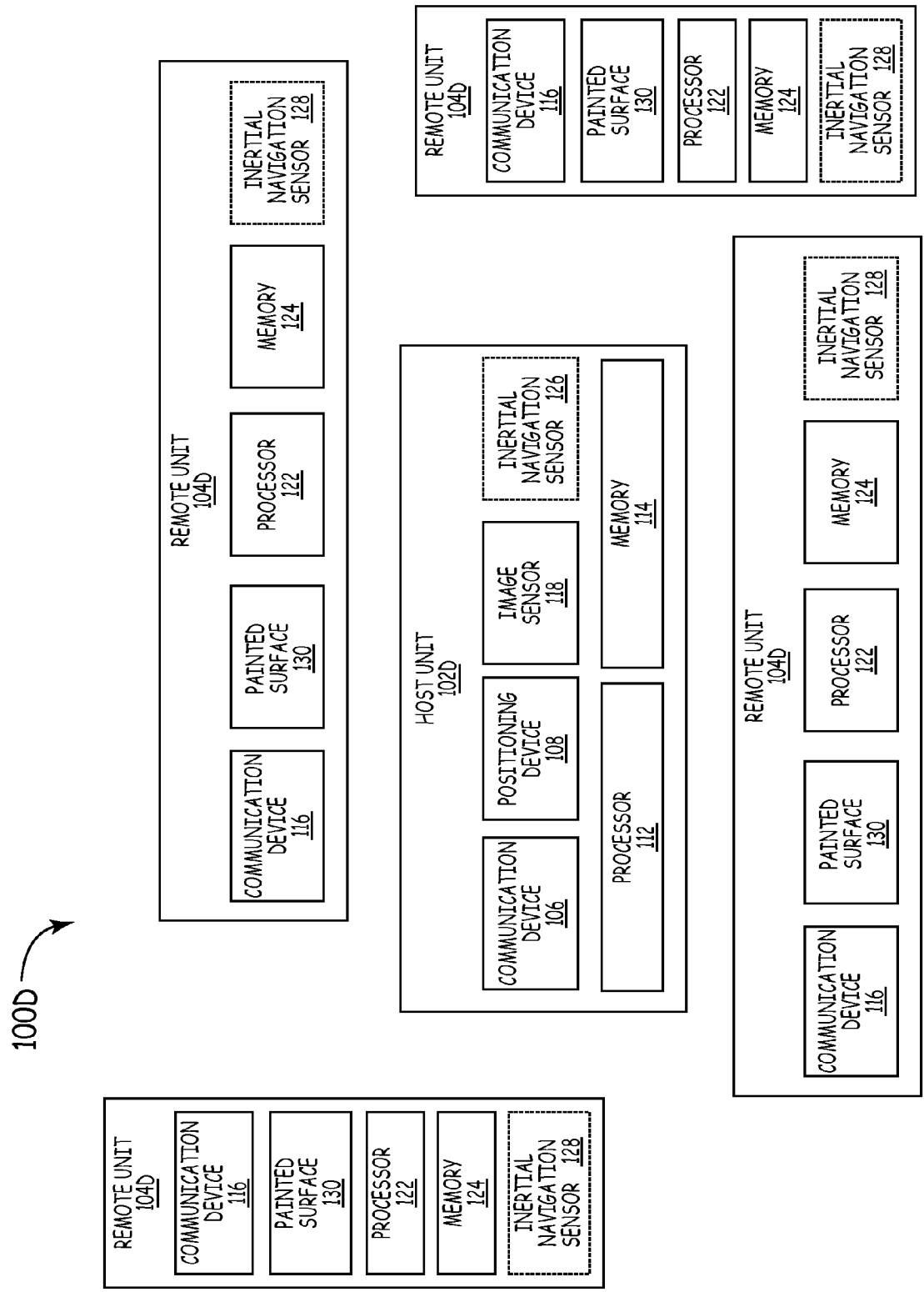

FIG. 1D is a block diagram depicting an exemplary embodiment of a collaborative navigation system 100D using pattern analysis at a host unit. System 100D includes similar components to systems 100B and operates according to similar principles and methods as system 100B described above. The primary difference between system 100D and system 100B is that system 100D uses painted patterns instead of structured light patterns projected onto surfaces. Exemplary collaborative navigation system 100D includes a host unit 102D and a plurality of remote units 104D. While four remote units 104D are shown in FIG. 1D, other exemplary embodiments of system 100D include greater or fewer remote units 104D. In some exemplary embodiments, only a single remote unit 104D is included in system 100D.

The components of each remote unit 104D that are also used in each remote unit 104B operate according to their description above. Specifically, each remote unit 104D includes a communication device 112, a painted surface 130, a processor 106, and a memory 106. Each of communication device 112, processor 122, and memory 124 operate according to their description with reference to FIG. 1B above.

Painted surface 130 of each remote unit 104D is similar to projection surface 110 of each remote unit 104B. The primary difference between painted surface 130 and projection surface 110 is that painted surface 130 includes painted patterns that are integrated into painted surface 130 in contrast to projection surface 110 operable to have structured light patterns projected onto it. In exemplary embodiments, painted surface 130 is substantially flat. In exemplary embodiments, the painted surface 130 is a specific structured surface that constitutes a specific recognized pattern when processed by the image sensor 118 as described below. In exemplary embodiments, the patterns are painted onto painted surface 130 using specific contrasting colors or shades to enable the most accurate image analysis of the painted pattern. In exemplary embodiments, the painted patterns are not visible to the eye and require infrared image sensors or other non-visible light image sensors to capture images of the patterns. In exemplary embodiments, instead of painted patterns, the patterns are created through other processes, such as by engraving, scraping, positioning objects, removing or adding material to a surface, or through other ways that could be distinguished by a robotic vision system.

Host unit 102D includes all the same components as host unit 102B, except for host unit 102D includes a painted surface 130 instead of including a projection surface 110. Similarly, remote units 104D include all the same components as remote units 104B, except for remote units 104D do not include illumination source 120 because the patterns are not projected and are instead integrated into painted surface 130.

The components of host unit 102D that are also in host unit 102B operate according to their description above. Specifically, host unit 102D includes a communication device 106, a positioning device 108, an image sensor 118, a processor 112, and a memory 114. Each of communication device 106, positioning device 108, image sensor 118, processor 112, and memory 114 operate according to their description with reference to FIG. 1B above.

Image sensor 118 of host unit 102D is configured to capture images of painted patterns integrated into painted surfaces 118. Because image sensor 118 is configured to capture images of painted patterns integrated into painted surface 130 instead of a projected structured light pattern on a projection surface 110, remote units 104C do not include illumination sources 120 to project structured light patterns.

Processor 112 operates as described above to compare aspects of the images of the patterns to aspects of a predetermined pattern. The predetermined pattern is the pattern that is painted onto the painted surface 130. The image of the predetermined pattern is distorted and/or deformed by the position and/or orientation of the painted surface 130 in the images captured by image sensor 118. Aspects that may be compared between the images and the predetermined pattern may be the size of elements in the pattern, the distance between elements of the pattern, or the distortion (such as deformation) of elements of the pattern based on the angle and/or rotation of the painted surface 130 with respect to the image sensor 118. This will be described in more detail with reference to FIG. 2B and FIG. 3 below.

In exemplary embodiments, pattern recognition is used to determine the relative position and relative orientation between the image sensor 118 at the host unit 102D and the pattern on the painted surface 130 at the projection unit 104D. In these exemplary embodiments, calculations are performed to determine how the pattern in the captured image is scaled, skewed, and translated from the predetermined pattern. The determination of how the image is scaled, skewed, and translated is used to determine the relative location and/or orientation between the image sensor 118 and the pattern on painted surface 130.

In other exemplary embodiments, at least one predefined distorted pattern is registered a priori as associated to a predefined distance and/or angle between the host unit 102D and remote units 104D. In exemplary embodiments, there are a number of predefined distorted patterns registered a priori as associated to various distances and/or angles between the host and remote units. In these embodiments, the remote unit 104D moves around until a pattern captured by the image sensor 118 matches one of the predefined distorted patterns that were registered a priori. In exemplary embodiments, an exact match is not necessary and matching within a threshold constitutes a match. In other embodiments, the host unit 104D moves around until a pattern captured by the image sensor 118 matches one of the predefined distorted patterns that were registered a priori. In exemplary embodiments, an exact match is not necessary and matching within a threshold constitutes a match. In exemplary embodiments, this pattern matching is less computationally intensive than pattern recognition techniques.

In exemplary embodiments, the relative orientation of each remote unit 104B relative to the host unit 102B is represented by relative roll, pitch, and heading (three relative rotations about the X, Y, and Z axes). Similarly, the absolute orientation of the host unit 102B is represented by absolute roll, pitch, and heading (three absolute rotations about the X, Y, and Z axes). In exemplary embodiments, the relative roll, pitch, and heading for a remote unit 104B relative to the host unit 102B are summed with the absolute roll, pitch, and heading for the host unit 102B to obtain the absolute roll, pitch, and heading for the remote unit 104B (absolute rotations about the X, Y, and Z axes of the remote unit 104B), which represents the absolute orientation of the remote unit 104B. In other exemplary embodiments, since the movement is on a surface, the relative position of the remote unit 104A relative to the host unit 102A can be simplified to two-dimensional space (two distances on the X and Y axes) and the relative orientation of the remote unit 104D relative to the host unit 102D can be simplified to two-dimensional space (two relative rotations about the X and Y axes).

In exemplary embodiments, the absolute position and/or orientation of the remote units 104D are calculated at the processor 112 of the host unit 102D. The absolute position and/or orientation of each remote unit 104B is then transmitted to each remote unit 104D from the host unit 102D using the communication device 106.

In exemplary embodiments, the absolute position and/or orientation of the remote units 104D are calculated at each respective processor 122 after both (1) the relative position and/or orientation between the host unit 102B and each respective remote unit 104D; and (2) the absolute position and/or orientation of the host unit 102D are communicated to the respective remote unit 104D from the host unit 102D using communication device 106 and communication device 116.

In exemplary embodiments, the exemplary collaborative navigation system 100D also includes inertial navigation sensors or other inertial navigation units that estimate the position and/or orientation in satellite navigation denied environments. The position estimates are periodically updated when satellite navigation information is available at the host unit and/or when both satellite navigation information is available at the host unit and the relative position and/or orientation information is calculated between the host unit and the remote unit.

Specifically, in some exemplary embodiments, host unit 102D includes inertial navigation sensor 126 that estimates the position and/or orientation of the host unit 102D. In some implementations, processor 112 also implements a Kalman filter (or other estimator) to provide a navigation state update from information received from the positioning device 108, when available, to the position and/or orientation estimates to reduce accumulated navigation errors and to calibrate the inertial navigation sensor 126. In other exemplary embodiments, other types of sensor data is fused together or provided with navigation state updates by a Kalman filter (or other estimator) implemented by processor 112.

Additionally, in some exemplary embodiments, each remote unit 104D includes an inertial navigation sensor 128 that estimates the position and/or orientation of the remote unit 104D. In some implementations, processor 122 also implements a Kalman filter (or other estimator) to provide a navigation state update based on the absolute position and/or orientation calculated for the remote units 104D using the image capture and analysis described above. This navigation state update is provided to the Kalman filter's (or other estimator's) position and/or orientation estimates to reduce accumulated navigation errors and to calibrate the inertial sensor 128. In other exemplary embodiments, other types of sensor data is fused together or provided with navigation state updates by a Kalman filter (or other estimator) implemented by processor 112.

In exemplary embodiments, there are times when the positioning device 108 does not have current absolute position and/or orientation information for the host unit 102D, such as when the positioning device is a GNSS (for example, GPS) and a GNSS signal is not available. During these times of GNSS (for example, GPS) denied navigation, the system could use a recursive approach to determine the absolute position and/or orientation of the host unit 102D. In exemplary embodiments using a recursive approach, the host unit 102D moves to a position of one of the remote units 104D that was previously determined. Once the host unit 102D assumes the previous position of the remote unit 104D, the host unit sets its current position to be the position previously determined by the host unit for the remote unit 104D. The remote unit 104D can then be deployed using the host unit's knowledge of its absolute position as reference. Once the remote unit 104D has its new position calculated, the host unit 102D could then move to the new position of remote unit 104D and set its current location to be the position previously determined by the host unit for the remote unit 104D. This recursive approach of determination of remote unit location and the host unit 102D assuming the position of remote unit 104D can be repeated indefinitely. In exemplary embodiments, once the GNSS/GPS signal comes back, the host unit 104D can resume normal operation as before without relying on the recursive approach. In exemplary embodiments, once the GNSS/GPS signal comes back (or the other positioning signal provided by the positioning device 108), the position determined by the GNSS/GPS receiver (or other positioning device 108) can be used as a state update for a Kalman filter or other state estimator.

Figure 2A:
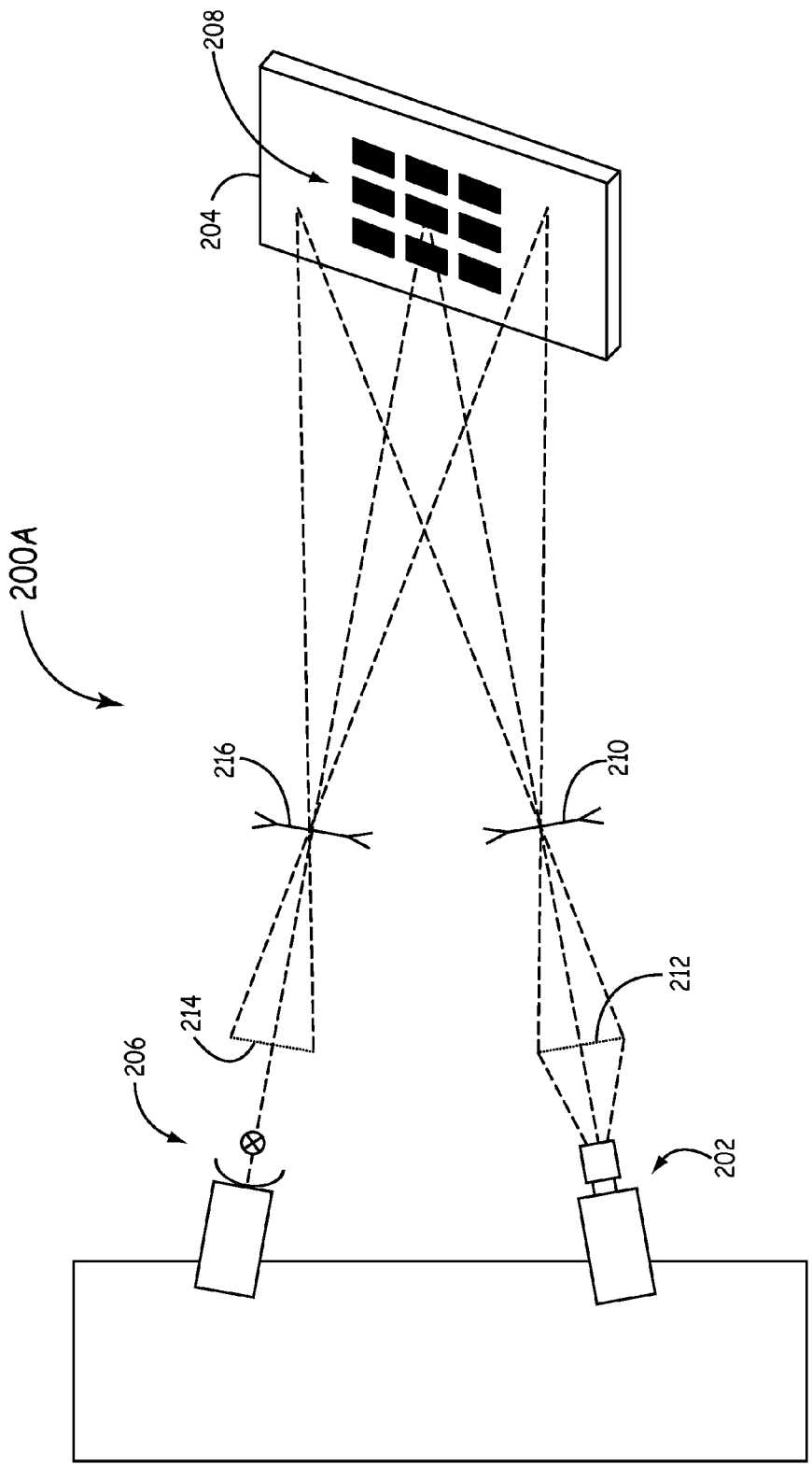
FIGS. 2A-2B are diagrams depicting exemplary embodiments of image sensors used in the optical pattern analysis performed by the systems of FIGS. 1A-1D.
Figure 2B:
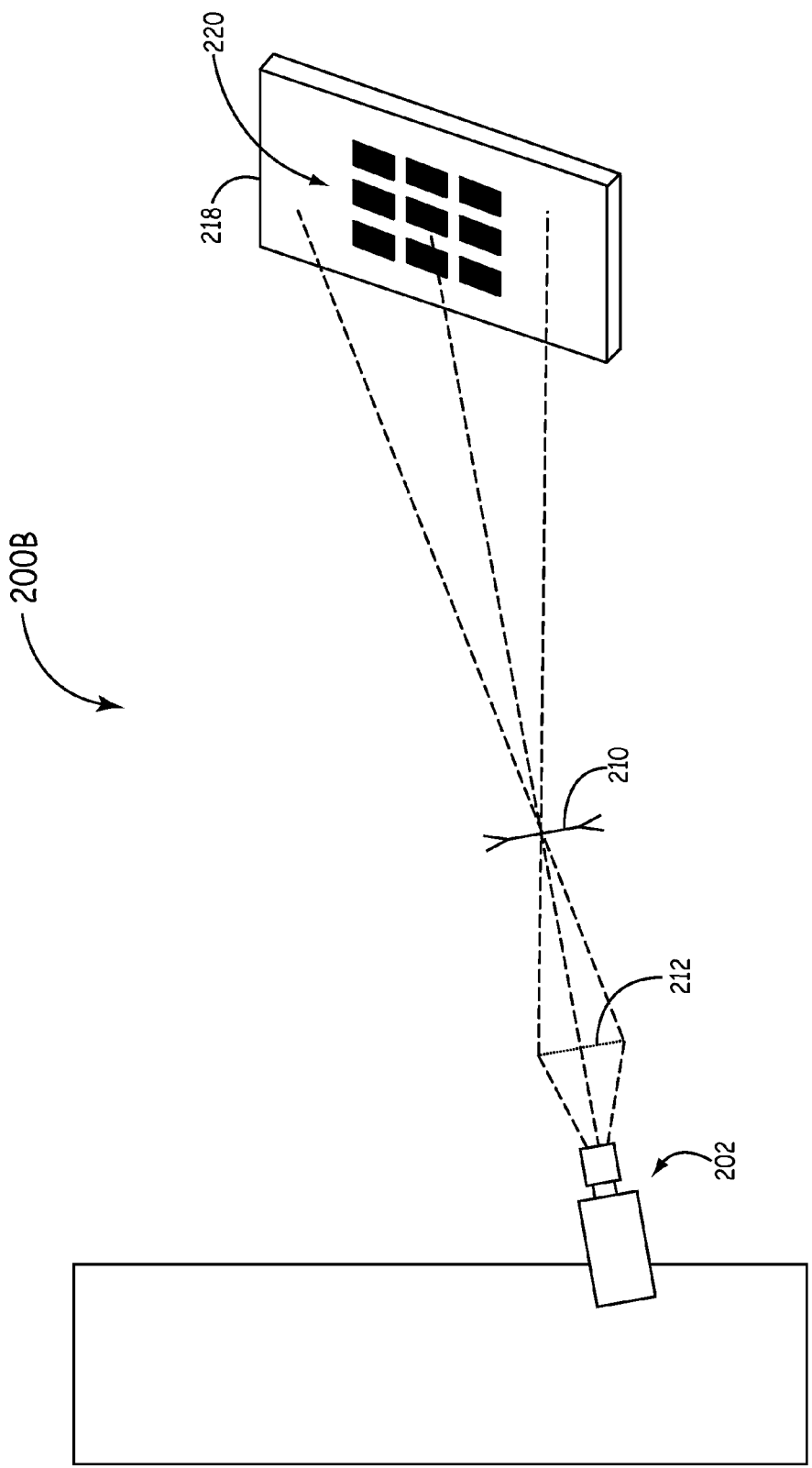

FIGS. 2A-2B are diagrams depicting exemplary embodiments of image sensor configurations used in the optical pattern analysis performed by the systems of FIGS. 1A-1D. Each of FIGS. 2A-2B illustrates a different image sensor configuration 200, labeled 200A-200B respectively.

FIG. 2A is a block diagram depicting an exemplary embodiment of an image sensor configuration 200A using structured lighting pattern analysis including an image sensor 202, a projection surface 204, and an illumination source 206. The image sensor configuration 200A shown in FIG. 2A could be used in either the collaborative navigation system 100A shown in FIG. 1A or the collaborative navigation system 100B shown in FIG. 1B.

Image sensor 202 is used to capture images of at least one structured light pattern 208 projected on the projection surface 204 by illumination source 206. The at least one structured light pattern 208 projected by the illumination source 206 onto projection surface 204 is a known patterns of pixels with known geometries, such as a grid, horizontal bars, or vertical bars.

The image sensor 202 captures images of the known structured light pattern 208 with the known geometries. In exemplary embodiments, the projection surface 204 is flat. In other exemplary embodiments, the projection surface 204 has other shapes. The relative orientation and position of the image sensor 202 relative to the projection surface 204 can then be calculated using computer vision systems by analyzing the difference in the geometries of the captured representation of the structured light pattern 208 in the captured images and the known geometry of the structured light pattern 208. In exemplary embodiments, at least one lens 210 is positioned between the image sensor 202 and the projection surface 204 to focus the light onto the image sensor 202. In exemplary embodiments, at least one optional grating 212 is positioned between the image sensor 202 and the lens 210. In exemplary embodiments, the optional grating 212 improves detection of the structured light pattern 208. In other exemplary embodiments, the configuration between the lens 210 and the optional grating 212 is different. In other exemplary embodiments, other optical elements are included in the image sensor portion of the image sensor configuration 200A.

In exemplary embodiments, the pattern 208 is projected using at least one pattern template 214 positioned between the illumination source 206 and the projection surface 204. In exemplary embodiments, the pattern template is a grating. In other exemplary embodiments, the pattern 208 is projected in other ways. In exemplary embodiments, at least one lens 216 is positioned between the illumination source 206 and the projection surface 204 to focus the light from the illumination source 206 onto the projection surface 208. In exemplary embodiments, the configuration between the pattern template 214 and the lens 216 is different. In other exemplary embodiments, other optical elements are included in the projection portion of the image sensor configuration 200A.

This process of determining position and attitude can be degraded when the viewing angle between the image sensor 202 and the structured light pattern 208 on the projection surface 204 becomes large. This degradation can be overcome by including several surfaces 204 in the sensor configuration 200A positioned at different angles relative to the nominal surface. Thus, in exemplary embodiments of the collaborative navigation systems 100A and 100B, a plurality of projection surfaces 110 are positioned at different angles relative to the nominal surface. The angular rotation and position offset can be encoded into the painted structure, so the user's navigation system can make the necessary computations to compensate for the various surface angles and positions.

FIG. 2B is a block diagram depicting an exemplary embodiment of an image sensor configuration 200B using pattern analysis including an image sensor 202 and a painted surface 218. The image sensor configuration 200B shown in FIG. 2B could be used in either the collaborative navigation system 100C shown in FIG. 1C or the collaborative navigation system 100D shown in FIG. 1D.

Instead of structured light patterns 208, image sensor 202 is used to capture images of at least one painted pattern 220 on the painted surface 218. In exemplary embodiments, the at least one painted pattern 220 is painted onto the painted surface 218. In exemplary embodiments, instead of being painted, painted patterns 220 are created through other processes, such as by engraving, scraping, positioning objects, removing or adding material to a surface, or through other ways that could be distinguished by a robotic vision system. In exemplary embodiments, the at least one painted pattern 220 is a known pattern with known geometries, such as a grid, horizontal bars, or vertical bars.

The image sensor 202 captures images of the known painted pattern 220 with the known geometries. In exemplary embodiments, the painted surface 218 is flat. In other exemplary embodiments, the painted surface 218 has other shapes. The relative orientation and position of the image sensor 202 relative to the painted surface 218 can then be calculated using computer vision systems by analyzing the difference in the geometries of the captured representation of the painted pattern 220 as captured in the captured images and the known geometry of the painted pattern 220. In exemplary embodiments, the at least one lens 210 is positioned between the image sensor 202 and the painted surface 218 to focus the light onto the image sensor 202. In exemplary embodiments, the at least one optional grating 212 is positioned between the image sensor 202 and the lens 210. In exemplary embodiments, the optional grating 212 improves detection of the painted pattern 220. In other exemplary embodiments, the configuration between the lens 210 and the optional grating 212 is different. In other exemplary embodiments, other optical elements are included in the image sensor portion of the image sensor configuration 200A.

The results of this process of determining position and attitude can be degraded when the viewing angle between the image sensor 202 and the painted pattern 220 on the painted surface 218 becomes large. This degradation can be overcome by providing several painted surfaces 218 in the sensor configuration 200B positioned at different angles relative to the nominal surface. Thus, in exemplary embodiments of the collaborative navigation systems 100C and 100D, a plurality of painted surfaces 218 are positioned at different angles relative to the nominal surface. The angular rotation and position offset can be encoded into the painted structure, so the user's navigation system can make the necessary computations to compensate for the various surface angles and positions.

In exemplary embodiments, image sensor configuration 200A is combined with image sensor configuration 200B to create an image sensor configuration that includes both structured light patterns 208 and painted patterns 220.

Figure 3:
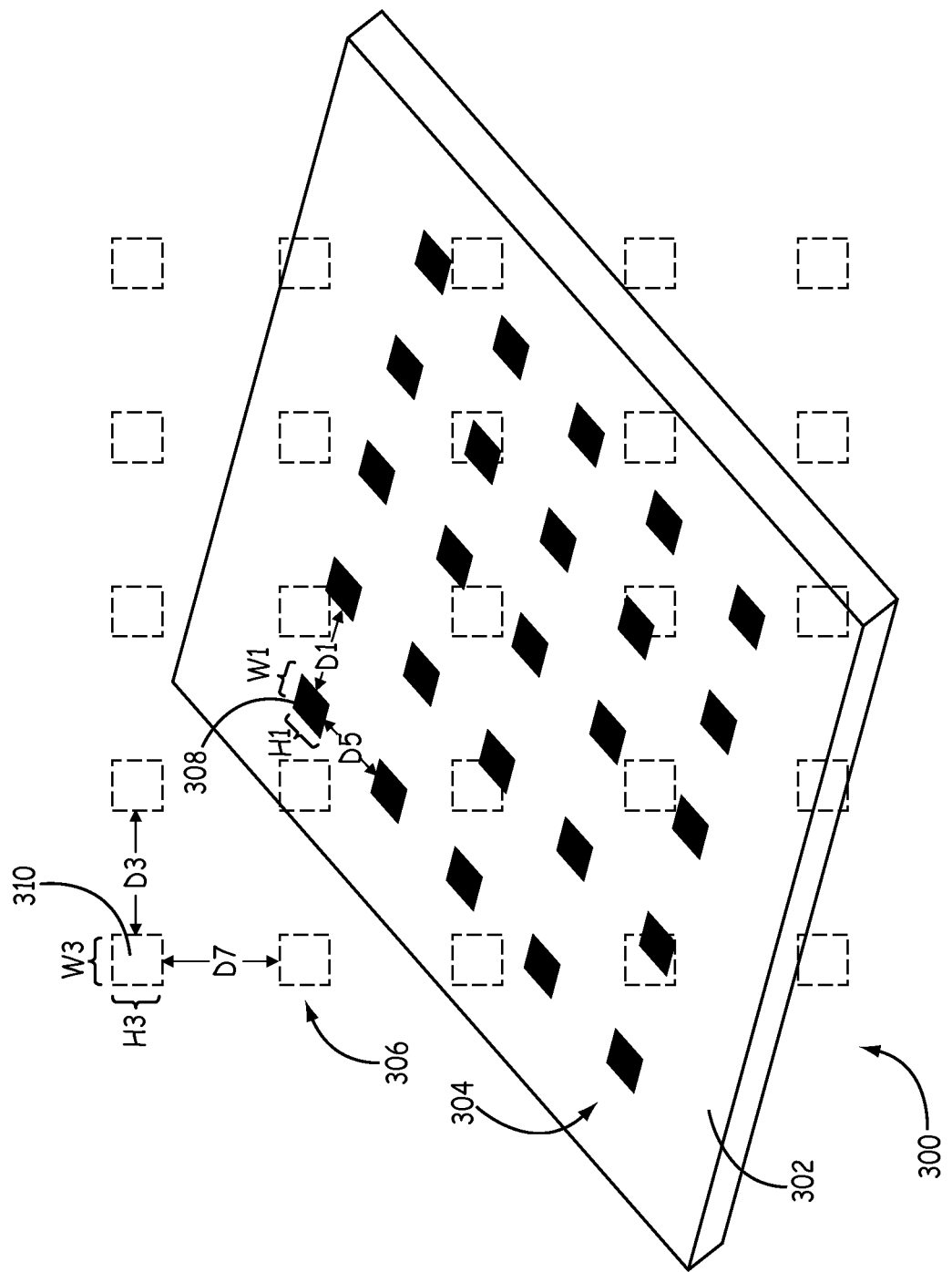
FIG. 3 is a diagram depicting an exemplary embodiment of an image of a pattern with an overlay of a predetermined pattern used in the optical pattern analysis performed by the systems of FIGS. 1A-1D.

FIG. 3 is a diagram depicting an exemplary embodiment of an image 300 of a captured pattern 304 on a surface 302 with an overlay of a known pattern 306 used in the optical pattern analysis performed by collaborative navigation systems 100A, 100B, 100C, and 100D shown in FIGS. 1A, 1B, 1C, and 1D respectively. Specifically, FIG. 3 shows an image 300 of a surface 302 having a captured pattern 304 on it. The captured pattern 304 is represented by dark squares that are distorted based on the position and/or orientation of the surface 302 relative to the image sensor capturing the image 300 (such as, but not limited to, image sensor 118 or image sensor 202 described above). Various geometries of the captured pattern 304 can be extracted from the image 300 of the captured pattern 304 captured by the image sensor.

A known pattern 306 is also overlayed on top of the captured pattern 304 in FIG. 3 to show the geometries of the known pattern 306 compared to the geometries of the captured pattern 304 in image 300. The known pattern 306 has known geometries. By comparing the extracted geometries from the captured pattern 304 with the known geometries of the known pattern 306, a processor (such as, but not limited to, processors 112 or 122 described above) implementing optical pattern analysis can determine the relative position between the surface 302 in the image 300 and the image sensor capturing the image 300.

Specifically, the captured pattern 304 includes a plurality of captured pattern elements 308 distributed throughout the captured pattern 304. Similarly, the known pattern 306 includes a plurality of known pattern elements 310 distributed throughout the known pattern 306. In exemplary embodiments, each captured pattern element 308 of the captured pattern 304 corresponds to a known pattern element 310 of the known pattern 306. The size, shape, and position of the plurality of captured pattern elements 308 and the spacing between the plurality of captured pattern elements 308 can be extracted from the image 300. In addition, the size, shape, and position of the plurality of known pattern elements 310 and the spacing between the plurality of known pattern elements 310 is known. Thus, the size, shape, and position of captured pattern elements 308 can be compared to the size, shape, and position of the known pattern elements 310 to help determine the relative position and orientation between the surface 302 in the image 300 and the image sensor capturing the image 300. Similarly, the spacing between captured pattern elements 308 can be compared to the spacing between the known pattern elements 310 to help determine the relative position and orientation between the surface 302 in the image 300 and the image sensor capturing the image 300. In exemplary embodiments, only a subset of the size, shape, and position of the pattern elements and the spacing between the pattern elements are used to determine the relative position and orientation between the surface 302 in the image 300 and the image sensor capturing the image 300.

In exemplary embodiments, a first height H1 represents the height of a captured pattern element 308, while a second height H3 represents the height of a corresponding known pattern element 310. In exemplary embodiments, a first width W1 represents the width of a captured pattern element 308, while a second width W3 represents the width of a corresponding known pattern element 310. In exemplary embodiments, the shape of the pattern elements 308 may be distorted due to pixel blurring and contrast merge causing the first height H1, the second height H3, the first width W1, and the second width W3 to be inaccurate. In these exemplary embodiments, the analysis can still be accurate if the relationship between the distances D1 and D5 and distances D3 and D7 can be analyzed without analyzing the first height H1, the second height H3, the first width W1, and the second width W3.

In exemplary embodiments, a first distance D1 represents the distance between a first captured pattern element 308 and a second captured pattern element 308, while a second distance D3 represents the distance between a first known pattern element 310 corresponding to the first captured pattern element 308 and a second known pattern element 310 corresponding to the second captured pattern element 308. In exemplary embodiments, a third distance D5 represents the distance between a first captured pattern element 308 and a third captured pattern element 308, while a fourth distance D7 represents the distance between a first known pattern element 310 corresponding to the first captured pattern element 308 and a third known pattern element 310 corresponding to the third captured pattern element 308.

In exemplary embodiments, a first X position X1 represents the X position of a captured pattern element 308, while a second X position X2 represents the X position of a corresponding known pattern element 310. In exemplary embodiments, a first Y position Y1 represents the Y position of a captured pattern element 308, while a second Y position Y2 represents the Y position of a corresponding known pattern element 310.

In exemplary embodiments at least a subset of the corresponding measurements are compared and/or analyzed between the captured pattern elements 308 of the captured pattern 304 and the corresponding known pattern elements 310 of the known pattern 306 to determine the relative position and/or orientation between the image sensor and the captured pattern 304.

In exemplary embodiments where pattern matching is used, the matching predefined distorted pattern would closely match captured pattern 304. In exemplary embodiments, the known pattern 306 is pre-distorted to create the predefined distorted pattern associated with a particular distance and/or angle from the surface 302. This predefined distorted pattern can then be registered a priori as associated to the predefined distance and/or angle. Additional pre-distortions of the known pattern 306 can be created to create additional predefined distorted patterns associated with various distances and/or angles between the imaging sensor and the surface 302. Then, as described above, a remote unit or host unit can move around testing the various predefined distorted patterns until it find one that matches within a threshold.

Figure 4A:
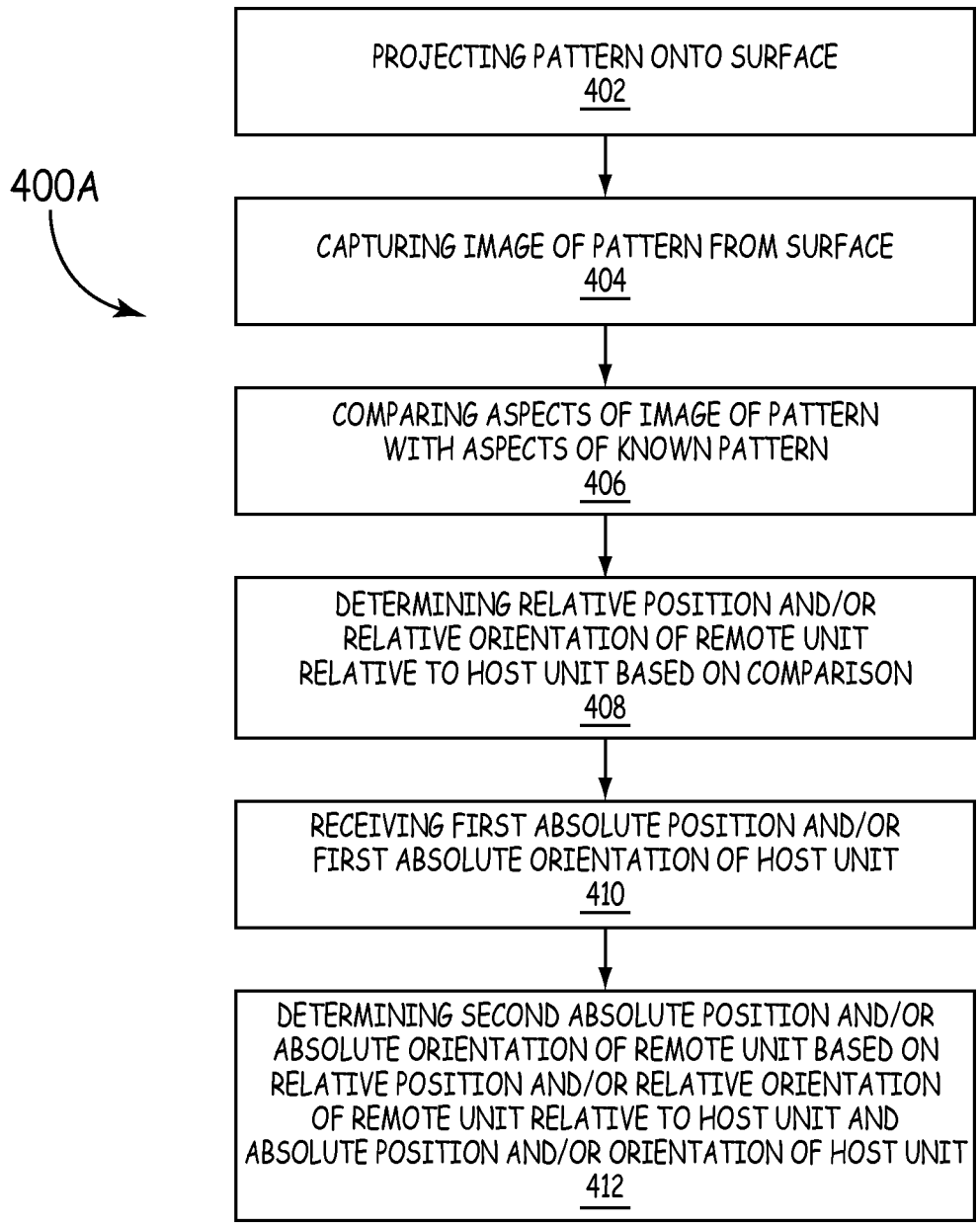
FIGS. 4A-4B are flow charts illustrated example methods for performing the optical pattern analysis of a pattern according to embodiments of the present invention.
Figure 4B:
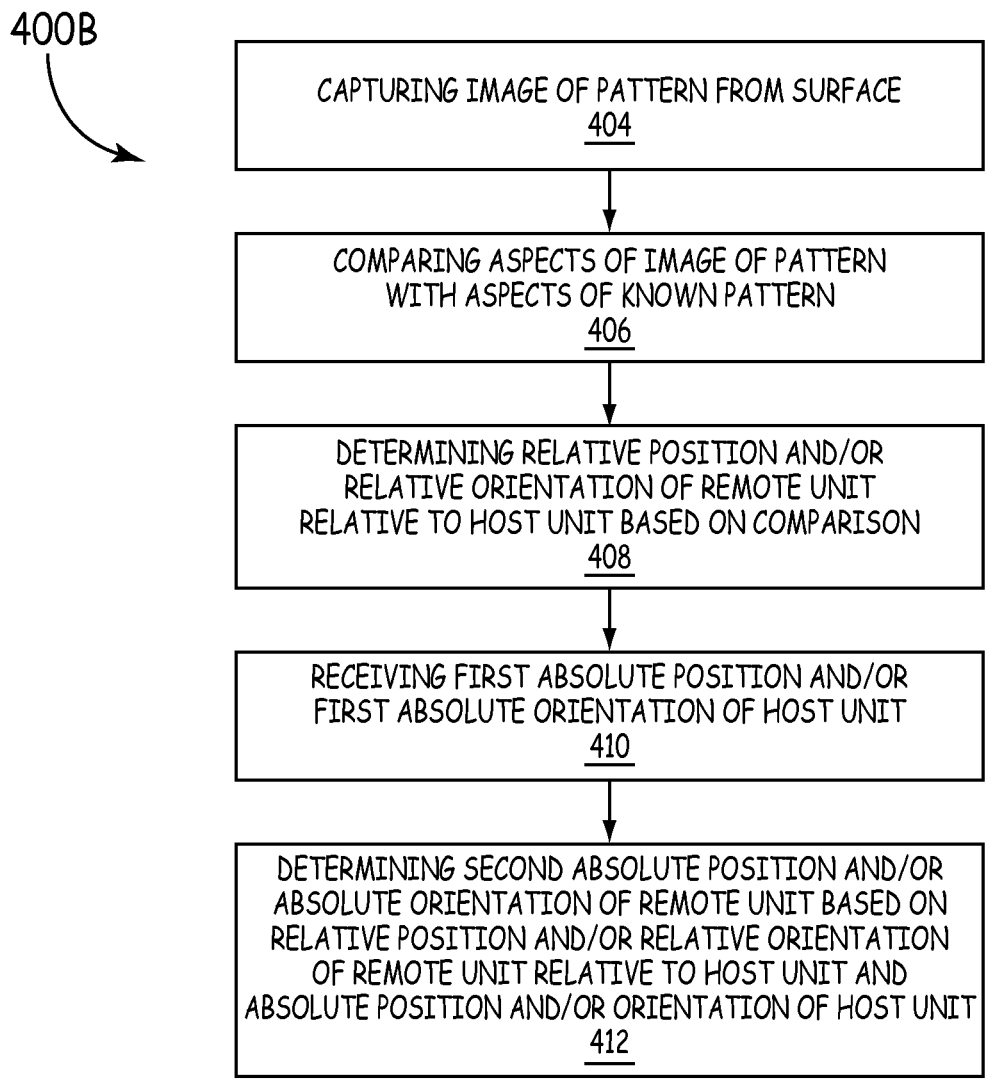

FIGS. 4A-4B are flow charts illustrating example methods 400 for performing the optical pattern analysis of a pattern according to embodiments of the present invention. Each of FIGS. 4A-4B illustrates a different embodiment of the method 400, labeled 400A-400B.

FIG. 4A is a flow chart illustrating one embodiment of a method 400A for performing optical pattern analysis of a pattern using structured lighting pattern analysis. At block 402, a pattern is projected onto a surface. In exemplary embodiments, the pattern is projected using the illumination source 120 of collaborative navigation system 100A positioned at the remote unit 104A, the illumination source 120 of collaborative navigation system 100B positioned at the host unit 102B, or the illumination source 206 of the image sensor configuration 200A. In exemplary embodiments, the pattern is projected onto the projection surface 110 of collaborative navigation system 100A positioned at the host unit 102A, the projection surface 110 of collaborative navigation system 100B positioned at the remote unit 104B, or the projection surface 204 of the image sensor configuration 200A.

At block 404, an image of the pattern is captured from the surface. In exemplary embodiments, the image of the pattern is captured from the projection surface 110 positioned at the host unit 102A by the image sensor 118 of collaborative navigation system 100A positioned at the remote unit 104A, from the projection surface 110 positioned at the remote unit 104B by the image sensor 118 of collaborative navigation system 100B positioned at the host unit 102B, or from the projection surface 204 by the image sensor 202 of the image sensor configuration 200A.

At block 406, aspects of the image of the pattern are compared with aspects of a known pattern. In exemplary embodiments, aspects of the image of the pattern are compared with aspects of the known pattern using processor 122 of remote unit 104A of collaborative navigation system 100A or processor 112 of host unit 104B of collaborative navigation system 100B. In exemplary embodiments, pattern matching is used to compare the aspects and determine whether the image captured at a particular position matches any predefined distorted patterns associated with particular distances and/or angles. In other exemplary embodiments, pattern recognition is used to determine the actual distances and/or angles between the known pattern and the pattern in the captured image.

At block 408, a relative position and/or relative orientation of a remote unit relative to a host unit is determined based on the comparison at block 406. In exemplary embodiments, the relative position and/or relative orientation of the remote unit relative to the host unit is determined using processor 122 of remote unit 104A of collaborative navigation system 100A or processor 112 of host unit 104B of collaborative navigation system 100B.

At block 410, a first absolute position and/or first absolute orientation of the host unit is received. In exemplary embodiments, the first absolute position and/or first absolute orientation of the host unit is received using the positioning device 108 of host unit 102A of collaborative navigation system 100A or the positioning device 108 of host unit 102B of collaborative navigation system 100B.

At block 412, a second absolute position and/or absolute orientation of the remote unit is determined based on the relative position and/or relative orientation of the remote unit relative to the host unit and the absolute position and/or orientation of the host unit. In exemplary embodiments, the second absolute position and/or absolute orientation of the remote unit is determined using processor 122 of remote unit 104A of collaborative navigation system 100A, processor 112 of host unit 104B of collaborative navigation system 100B, or processor 122 of remote unit 104B of collaborative navigation system 100B.

FIG. 4B is a flow chart illustrating one embodiment of a method 400B for performing optical pattern analysis of a pattern using pattern analysis. The only difference between method 400B of FIG. 4B and method 400A of FIG. 4A is that method 400B of FIG. 4B does not require block 402 required by method 400A of FIG. 4B because the image pattern is not projected onto a surface. Instead, the image pattern is already on the surface and method 400B begins at block 404, by capturing an image of the pattern from the surface. In exemplary embodiments, the image of the pattern is captured from the painted surface 130 positioned at the host unit 102C by the image sensor 118 of collaborative navigation system 100C positioned at the remote unit 104C, from the painted surface 130 positioned at the remote unit 104D by the image sensor 118 of collaborative navigation system 100D positioned at the host unit 102D, or from the painted surface 218 by the image sensor 202 of the image sensor configuration 200B.

At block 406, aspects of the image of the pattern are compared with aspects of a known pattern. In exemplary embodiments, the relative position and/or relative orientation of the remote unit relative to the host unit is determined using processor 122 of remote unit 104C of collaborative navigation system 100C or processor 112 of host unit 104D of collaborative navigation system 100D. In exemplary embodiments, pattern matching is used to compare the aspects and determine whether the image captured at a particular position matches any predefined distorted patterns associated with particular distances and/or angles. In other exemplary embodiments, pattern recognition is used to determine the actual distances and/or angles between the known pattern and the pattern in the captured image.

At block 408, a relative position and/or relative orientation of a remote unit relative to a host unit is determined based on the comparison at block 406. In exemplary embodiments, the relative position and/or relative orientation of the remote unit relative to the host unit is determined using processor 122 of remote unit 104C of collaborative navigation system 100C or processor 112 of host unit 104D of collaborative navigation system 100D.

At block 410, a first absolute position and/or first absolute orientation of the host unit is received. In exemplary embodiments, the first absolute position and/or first absolute orientation of the host unit is received using the positioning device 108 of host unit 102C of collaborative navigation system 100C or the positioning device 108 of host unit 102D of collaborative navigation system 100D.

At block 412, a second absolute position and/or absolute orientation of the remote unit is determined based on the relative position and/or relative orientation of the remote unit relative to the host unit and the absolute position and/or orientation of the host unit. In exemplary embodiments, the second absolute position and/or absolute orientation of the remote unit is determined using processor 122 of remote unit 104C of collaborative navigation system 100C, processor 112 of host unit 104D of collaborative navigation system 100D, or processor 122 of remote unit 104D of collaborative navigation system 100D.

As used in this description, a processor (such as, but not limited to, processor 112 and processor 122 described above with reference to FIGS. 1A-1D) includes or functions with software programs, firmware or other computer readable instructions for carrying out various methods, process tasks, calculations, and control functions, used in the collaborative navigation systems using optical pattern analysis to determine relative locations between a host unit and a remote unit and methods for performing the optical pattern analysis of a pattern according to embodiments of the present invention.

These instructions are typically stored on any appropriate computer readable medium (such as, but not limited to, memory 114 and memory 124 described above with reference to FIGS. 1A-1D) used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A navigation system comprising:
   a host unit having:
      a positioning device that determines at least one of a first absolute position and a first absolute orientation of the host unit;
      a first communication device that communicates signals;
      a first processor; and
      a first memory;
   a remote unit having:
      a second communication device that receives the signals from the first communication device;
      a second processor; and
      a second memory;
   wherein at least one of the first processor and the second processor compares first aspects of a known pattern with second aspects of an image of a captured pattern positioned on a surface at at least one of the host unit and the remote unit;
   wherein at least one of the first processor and the second processor determines at least one of a relative position and a relative orientation of the remote unit relative to the host unit based on the comparison of the first aspects and the second aspects;
   wherein at least one of the first processor and the second processor determines at least one of:
      a second absolute position of the remote unit based on the first absolute position and the relative position; and
      a second absolute orientation of the remote unit based on the first absolute orientation and the relative orientation; and
   wherein the signals include data selected from the group consisting of the first absolute position, the first absolute orientation, the relative position, the relative orientation, the second absolute position, and the second absolute orientation, wherein the data is communicated from the host unit to the remote unit using the first communication device and the second communication device.

2. The navigation system of claim 1, wherein the captured pattern is a structured light pattern.

3. The navigation system of claim 1, wherein at least one of the host unit and the remote unit further comprises an illumination source that projects the captured pattern onto the surface;
wherein the illumination source is positioned at the remote unit when the surface is positioned at the host unit; and
wherein the illumination source is positioned at the host unit when the surface is positioned at the remote unit.

4. The navigation system of claim 3, wherein the light source is at least one of an infrared light source and a visible light source.

5. The navigation system of claim 1, wherein the remote unit was previously positioned at the at least one of the first absolute position and the first absolute orientation;
wherein the at least one of the first absolute position and the first absolute orientation were previously calculated for the remote unit; and
wherein the host unit was repositioned to the at least one of the first absolute position and the first absolute orientation in place of the remote unit.

6. The navigation system of claim 1, wherein the known pattern is associated with at least one of a distance and an angle of rotation; and
wherein at least one of the first processor and the second processor compares the first aspects of the known pattern with second aspects of the image of the captured pattern by determining whether the image of the captured pattern matches the known pattern within a threshold; and
wherein when the image of the captured pattern matches the known pattern within the threshold, using the at least one of the distance and the angle of rotation to determine the at least one of the relative position and the relative orientation.

7. The navigation system of claim 1, further comprising:
wherein the host unit further includes:
the surface;
wherein the remote unit further includes:
an image sensor that captures the image of the captured pattern positioned on the surface at the host unit;
wherein the signals communicated from the first communication device at the host unit to the second communication device at the remote unit include at least one of the first absolute position and the first absolute orientation of the host unit; and
wherein the second processor:
compares the first aspects of the known pattern with the second aspects of the image of the captured pattern positioned on the surface at the host unit;
determines at least one of the relative position and the relative orientation of the remote unit relative to the host unit based on the comparison of the first aspects and the second aspects; and
determines at least one of:
the second absolute position of the remote unit based on the relative position of the remote unit relative to the host unit and the first absolute position of the host unit; and
the second absolute orientation of the remote unit based on the relative orientation of the remote unit relative to the host unit and the first absolute orientation of the host unit.

8. The navigation system of claim 1, further comprising:
wherein the remote unit further includes:
the surface;
wherein the host unit further includes:
an image sensor that captures the image of the captured pattern positioned on the surface at the remote unit;
wherein the signals communicated from the first communication device at the host unit to the second communication device at the remote unit include at least one of the second absolute position and the second absolute orientation of the remote unit; and
wherein the first processor:
compares the first aspects of the known pattern with the second aspects of the image of the captured pattern positioned on the surface at the remote unit;
determines at least one of the relative position and the relative orientation of the remote unit relative to the host unit based on the comparison of the first aspects and the second aspects; and
determines at least one of:
the second absolute position of the remote unit based on the relative position of the remote unit relative to the host unit and the first absolute position of the host unit; and
the second absolute orientation of the remote unit based on the relative orientation of the remote unit relative to the host unit and the first absolute orientation of the host unit.

9. The navigation system of claim 1, further comprising:
wherein the remote unit further includes:
the surface;
wherein the host unit further includes:
an image sensor that captures the image of the captured pattern positioned on the surface at the remote unit;
wherein the signals communicated from the first communication device at the host unit to the second communication device at the remote unit include at least one of the relative position and the relative orientation of the remote unit relative to the host unit;
wherein the first processor:
compares the first aspects of the known pattern with the second aspects of the image of the captured pattern positioned on the surface at the remote unit; and
determines at least one of the relative position and the relative orientation of the remote unit relative to the host unit based on the comparison of the first aspects and the second aspects; and
wherein the second processor:
determines at least one of:
the second absolute position of the remote unit based on the relative position of the remote unit relative to the host unit and the first absolute position of the host unit; and
the second absolute orientation of the remote unit based on the relative orientation of the remote unit relative to the host unit and the first absolute orientation of the host unit.

10. The navigation system of claim 1, wherein the positioning device includes a satellite navigation system receiver through which satellite navigation signals are received from at least one satellite.

11. The navigation system of claim 1, wherein at least one of the host unit and the remote unit is attached to at least one of a vehicle, a moving object, a stationary object, a structure, and a person.

12. A method comprising:
capturing an image of a pattern from a surface at an imaging device, wherein one of the imaging device and the pattern is positioned at a host unit and the other is positioned at a remote unit, the host unit and the remote unit including at least one processor;
comparing first aspects of the image of the pattern with second aspects of a predetermined pattern using the at least one processor;
determining at least one of a relative position and a relative orientation of the remote unit relative to the host unit based on the comparison of the first aspects and the second aspects using the at least one processor;
receiving at least one of a first absolute position and a first absolute orientation of the host unit at the at least one processor;
determining at least one of:
  a second absolute position of the remote unit based on the relative position of the remote unit relative to the host unit and the first absolute position of the host unit using the at least one processor; and
  a second absolute orientation of the remote unit based on the relative orientation of the remote unit relative to the host unit and the first absolute orientation of the host unit using the at least one processor; and
communicating data from the host unit to the remote unit, the data selected from the group consisting of the first absolute position, the first absolute orientation, the relative position, the relative orientation, the second absolute position, and the second absolute orientation.

13. The method of claim 12, wherein capturing the image of the pattern from the surface occurs at the remote unit;
wherein determining at least one of a relative position and a relative orientation occurs at the remote unit; and
wherein determining at least one of a second absolute position and a second absolute orientation occurs at the remote unit.

14. The method of claim 12, further comprising:
projecting the pattern onto the surface; and
wherein the projected pattern is a structured light pattern.

15. The method of claim 14, wherein the pattern is projected from the remote unit onto the surface at the host unit;
wherein capturing the image of the pattern from the surface occurs at the remote unit;
wherein determining at least one of a relative position and a relative orientation occurs at the remote unit; and
wherein determining at least one of a second absolute position and a second absolute orientation occurs at the remote unit.

16. A system comprising:
an image sensor configured to capture an image of a pattern positioned on a remote surface, wherein the remote surface is positioned at a device remote to the system;
a processor configured to:
  receive at least one of a first absolute position and a first absolute orientation of the system;
  compare first aspects of the image of the pattern with second aspects of a predetermined pattern; and
  determine at least one of a relative position and a relative orientation of the system relative to the remote surface based on the comparison of the first aspects and the second aspects;
a communication device configured to at least one of:
  receive at least one of the first absolute position and the first absolute orientation from the device remote to the system;
  receive at least one of the relative position and the relative orientation of the system relative to the remote surface from the device remote to the system;
  transmit at least one of the relative position and the relative orientation of the system relative to the remote surface to the device remote to the system; and
  transmit at least one of a second absolute position and a second absolute orientation of the remote surface to the device remote to the system; and
wherein at least one of:
  the second absolute position of the remote surface is determined based on the relative position of the system relative to the remote surface and the first absolute position of the remote surface; and
  the second absolute orientation of the remote surface is determined based on the relative orientation of the system relative to the remote surface and the first absolute orientation of the remote surface.

17. The system of claim 16, wherein the system is a remote unit;
wherein the device remote to the system is a host unit;
wherein the remote surface is positioned at the host unit;
wherein the communication device is configured to receive at least one of the first absolute position and the first absolute orientation from the host unit; and
wherein the processor is further configured to determine at least one of:
the second absolute position of the remote surface based on the relative position of the system relative to the remote surface and the first absolute position of the system; and
the second absolute orientation of the remote surface based on the relative orientation of the system relative to the remote surface and the first absolute orientation of the system.

18. The system of claim 16, wherein the system is a host unit;
wherein the device remote to the system is a remote unit;
wherein the remote surface is positioned at the remote unit;
wherein the communication device is configured to transmit at least one of the second absolute position and the second absolute orientation to the remote unit; and
wherein the processor is further configured to determine at least one of:
the second absolute position of the remote surface based on the relative position of the system relative to the remote surface and the first absolute position of the system; and
the second absolute orientation of the remote surface based on the relative orientation of the system relative to the remote surface and the first absolute orientation of the system.

19. The system of claim 16, wherein the system is a host unit;
wherein the device remote to the system is a remote unit;
wherein the remote surface is positioned at the remote unit;
wherein the communication device is configured to transmit at least one of the relative position and the relative orientation of the system relative to the remote surface to the remote unit;
wherein the communication device is further configured to transmit at least one of the first absolute position and the first absolute orientation to the remote unit; and
wherein determining the at least one of the second absolute position and the second absolute orientation of the remote surface occurs at a second processor positioned at the remote unit.

20. The system of claim 16, wherein the system further includes a first illumination source configured to project the pattern onto the remote surface as a structured light pattern.

* * * * *